United States Patent
Brady, Jr. et al.

(10) Patent No.: US 9,602,608 B2
(45) Date of Patent: *Mar. 21, 2017

(54) SYSTEM AND METHOD FOR NOTIFYING A USER OF PEOPLE, PLACES OR THINGS HAVING ATTRIBUTES MATCHING A USER'S STATED PREFERENCE

(71) Applicant: Chemtron Research LLC, Dover, DE (US)

(72) Inventors: James V. Brady, Jr., River Forest, IL (US); Dana M. Sohr, Columbia, MD (US)

(73) Assignee: Chemtron Research LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/164,698

(22) Filed: Jan. 27, 2014

(65) Prior Publication Data
US 2014/0143341 A1    May 22, 2014

Related U.S. Application Data

(63) Continuation of application No. 13/645,025, filed on Oct. 4, 2012, now Pat. No. 8,680,985, which is a
(Continued)

(51) Int. Cl.
*G06F 15/16* (2006.01)
*H04L 29/08* (2006.01)
(Continued)

(52) U.S. Cl.
CPC .............. *H04L 67/22* (2013.01); *G01C 21/20* (2013.01); *G01C 21/32* (2013.01);
(Continued)

(58) Field of Classification Search
CPC ..................................................... G06F 3/0488
(Continued)

(56) References Cited

U.S. PATENT DOCUMENTS

| 5,179,519 A | 1/1993 | Adachi et al. |
| 5,225,842 A | 7/1993 | Brown et al. |

(Continued)

FOREIGN PATENT DOCUMENTS

| EP | 1219927 A2 | 7/2002 |
| EP | 1346569 A2 | 9/2003 |

(Continued)

OTHER PUBLICATIONS

Promotional material for Adaptive Classified Server; pages from www.adaptiveinfo.com, dated Apr. 17, 2002.
(Continued)

*Primary Examiner* — Daryl Pope
(74) *Attorney, Agent, or Firm* — Panitch Schwarze Belisario & Nadel LLP

(57) ABSTRACT

A location-based and preference-based system and method for matching media content about persons, places and things with the expressed preferences of mobile users to notify users about and provide users with access to media content about persons, places and things that match the user's expressed preferences. The system thus provides information such as stories or articles that match the user's interests and relate to their location. The system may assign ranks to all of the media content that meets that user's preferences wherein, in one embodiment, it will automatically play them in the assigned order. Comparison of the user's preferences with the various profiles of the media content allows the user only to be informed of the media content for those persons, places or things that the user is likely to be interested in. The
(Continued)

system and method thus provides for a mobile real-time point of interest exchange network.

20 Claims, 18 Drawing Sheets

Related U.S. Application Data continuation of application No. 13/328,851, filed on Dec. 16, 2011, now Pat. No. 8,427,303, which is a continuation-in-part of application No. 13/040,571, filed on Mar. 4, 2011, now Pat. No. 8,102,253, which is a continuation of application No. 12/401,347, filed on Mar. 10, 2009, now Pat. No. 7,911,335, which is a continuation of application No. 11/372,307, filed on Mar. 9, 2006, now Pat. No. 7,589,628, which is a continuation-in-part of application No. 10/609,961, filed on Jun. 27, 2003, now Pat. No. 7,071,842.

(60) Provisional application No. 60/391,982, filed on Jun. 27, 2002.

(51) Int. Cl.
| | | |
|---|---|---|
| *G01C 21/20* | (2006.01) | |
| *G01C 21/32* | (2006.01) | |
| *G01C 21/36* | (2006.01) | |
| *G06Q 10/10* | (2012.01) | |
| *G06Q 30/02* | (2012.01) | |
| *G08G 1/0968* | (2006.01) | |
| *G08G 1/0969* | (2006.01) | |
| *G08G 1/00* | (2006.01) | |
| *G09F 27/00* | (2006.01) | |
| *H04W 4/02* | (2009.01) | |
| *H04W 4/20* | (2009.01) | |
| *G06F 17/30* | (2006.01) | |

(52) U.S. Cl.
CPC ..... *G01C 21/3679* (2013.01); *G06F 17/3087* (2013.01); *G06F 17/30867* (2013.01); *G06Q 10/10* (2013.01); *G06Q 30/02* (2013.01); *G08G 1/0969* (2013.01); *G08G 1/096838* (2013.01); *G08G 1/20* (2013.01); *G09F 27/00* (2013.01); *H04L 67/18* (2013.01); *H04L 67/306* (2013.01); *H04W 4/02* (2013.01); *H04W 4/028* (2013.01); *H04W 4/206* (2013.01)

(58) Field of Classification Search
USPC .. 340/988, 990, 991, 539.1, 539.11, 539.13; 701/200, 207, 211
See application file for complete search history.

(56) References Cited

U.S. PATENT DOCUMENTS

| | | |
|---|---|---|
| 5,323,321 A | 6/1994 | Smith, Jr. |
| 5,485,161 A | 1/1996 | Vaughn |
| 5,539,398 A | 7/1996 | Hall et al. |
| 5,552,989 A | 9/1996 | Bertrand |
| 5,565,874 A | 10/1996 | Rode |
| 5,767,795 A | 6/1998 | Schaphorst |
| 5,839,088 A | 11/1998 | Hancock et al. |
| 5,948,040 A | 9/1999 | DeLorme et al. |
| 6,005,494 A | 12/1999 | Schramm |
| 6,006,161 A | 12/1999 | Katou |
| 6,014,090 A | 1/2000 | Rosen et al. |
| 6,035,253 A | 3/2000 | Hayashi et al. |
| 6,040,829 A | 3/2000 | Croy et al. |
| 6,047,236 A | 4/2000 | Hancock et al. |
| 6,067,502 A | 5/2000 | Hayashida et al. |
| 6,078,865 A | 6/2000 | Koyanagi |
| 6,122,658 A | 9/2000 | Chaddha |
| 6,202,023 B1 | 3/2001 | Hancock et al. |
| 6,202,026 B1 | 3/2001 | Nimura et al. |
| 6,212,470 B1 | 4/2001 | Seymour et al. |
| 6,223,122 B1 | 4/2001 | Hancock et al. |
| 6,230,199 B1 | 5/2001 | Revashetti et al. |
| 6,266,612 B1 | 7/2001 | Dussell et al. |
| 6,314,370 B1 | 11/2001 | Curtright |
| 6,317,718 B1 | 11/2001 | Fano |
| 6,326,918 B1 | 12/2001 | Stewart |
| 6,339,397 B1 | 1/2002 | Baker |
| 6,339,744 B1 | 1/2002 | Hancock et al. |
| 6,343,274 B1 | 1/2002 | McCollom et al. |
| 6,343,317 B1 | 1/2002 | Glorikian |
| 6,347,230 B2 | 2/2002 | Koshima et al. |
| 6,349,257 B1 | 2/2002 | Liu et al. |
| 6,349,290 B1 | 2/2002 | Horowitz et al. |
| 6,353,785 B1 | 3/2002 | Shuman et al. |
| 6,356,812 B1 | 3/2002 | Cragun |
| 6,356,838 B1 | 3/2002 | Paul |
| 6,360,167 B1 | 3/2002 | Millington et al. |
| 6,366,855 B1 | 4/2002 | Reilly et al. |
| 6,370,513 B1 | 4/2002 | Kolawa et al. |
| 6,370,566 B2 | 4/2002 | Discolo et al. |
| 6,370,578 B2 | 4/2002 | Revashetti et al. |
| 6,374,177 B1 | 4/2002 | Lee et al. |
| 6,374,180 B1 | 4/2002 | Slominski et al. |
| 6,381,603 B1 | 4/2002 | Chan et al. |
| 6,401,036 B1 | 6/2002 | Geier et al. |
| 6,405,129 B1 | 6/2002 | Yokota |
| 6,408,307 B1 | 6/2002 | Semple et al. |
| 6,415,224 B1 | 7/2002 | Wako et al. |
| 6,415,227 B1 | 7/2002 | Lin |
| 6,430,501 B1 | 8/2002 | Slominski |
| 6,453,347 B1 | 9/2002 | Revashetti et al. |
| 6,456,854 B1 | 9/2002 | Chern et al. |
| 6,480,885 B1 | 11/2002 | Olivier |
| 6,505,121 B1 | 1/2003 | Russell |
| 6,526,351 B2 | 2/2003 | Whitham |
| 6,529,143 B2 | 3/2003 | Mikkola et al. |
| 6,542,812 B1 | 4/2003 | Obradovich et al. |
| 6,542,814 B2 | 4/2003 | Polidi et al. |
| 6,549,678 B1 | 4/2003 | Gindele et al. |
| 6,549,768 B1 | 4/2003 | Fraccaroli |
| 6,608,556 B2 | 8/2003 | De Moerloose et al. |
| 6,618,593 B1 | 9/2003 | Drutman et al. |
| 6,650,902 B1 | 11/2003 | Richton |
| 6,654,800 B1 | 11/2003 | Rieger, III |
| 6,680,694 B1 | 1/2004 | Knockeart et al. |
| 6,687,608 B2 | 2/2004 | Sugimoto et al. |
| 6,690,295 B1 | 2/2004 | De Boer |
| 6,693,651 B2 | 2/2004 | Biebesheimer et al. |
| 6,701,311 B2 | 3/2004 | Biebesheimer et al. |
| 6,707,421 B1 | 3/2004 | Drury et al. |
| 6,732,045 B1 | 5/2004 | Irmer |
| 6,741,188 B1 | 5/2004 | Miller et al. |
| 6,745,123 B1 | 6/2004 | Petzold et al. |
| 6,801,909 B2 | 10/2004 | Delgado et al. |
| 6,804,605 B2 | 10/2004 | Flick |
| 6,812,860 B1 | 11/2004 | Schwarzwalder, Jr. |
| 6,819,919 B1 | 11/2004 | Tanaka |
| 6,829,532 B2 | 12/2004 | Obradovich et al. |
| 6,879,836 B2 | 4/2005 | Nakamoto et al. |
| 6,879,838 B2 | 4/2005 | Rankin et al. |
| 6,931,254 B1 | 8/2005 | Egner et al. |
| 6,931,399 B2 | 8/2005 | Cheng et al. |
| 6,957,393 B2 | 10/2005 | Fano et al. |
| 6,968,179 B1 | 11/2005 | De Vries |
| 6,973,298 B2 | 12/2005 | Chang et al. |
| 6,982,656 B1 | 1/2006 | Coppinger et al. |
| 6,986,154 B1 | 1/2006 | Price et al. |
| 6,988,103 B2 | 1/2006 | Chithambaram et al. |
| 7,064,681 B2 | 6/2006 | Horstemeyer |
| 7,068,189 B2 | 6/2006 | Brescia |
| 7,071,842 B1 | 7/2006 | Brady, Jr. |
| 7,075,459 B1 | 7/2006 | Begin et al. |
| 7,082,365 B2 | 7/2006 | Sheha et al. |

(56) References Cited

U.S. PATENT DOCUMENTS

| | | |
|---|---|---|
| 7,085,806 B1 | 8/2006 | Shapira |
| 7,085,818 B2 | 8/2006 | Brown et al. |
| 7,092,724 B2 | 8/2006 | Fellenstein et al. |
| 7,092,952 B1 | 8/2006 | Wilens |
| 7,130,742 B2 | 10/2006 | Kobuya et al. |
| 7,133,813 B2 | 11/2006 | Salani et al. |
| 7,181,438 B1 | 2/2007 | Szabo |
| 7,241,219 B2 | 7/2007 | Walker et al. |
| 7,248,884 B2 | 7/2007 | Miyamoto |
| 7,254,406 B2 | 8/2007 | Beros et al. |
| 7,269,664 B2 | 9/2007 | Hutsch et al. |
| 7,289,814 B2 | 10/2007 | Amir et al. |
| 7,296,066 B2 | 11/2007 | Lehaff et al. |
| 7,321,387 B2 | 1/2008 | Novais et al. |
| 7,321,824 B1 | 1/2008 | Nesbitt |
| 7,373,336 B2 | 5/2008 | Jasinschi et al. |
| 7,386,318 B2 | 6/2008 | Moon et al. |
| 7,395,031 B1 | 7/2008 | Ritter |
| 7,400,879 B2 | 7/2008 | Lehaff et al. |
| 7,401,098 B2 | 7/2008 | Baker |
| 7,412,202 B2 | 8/2008 | Gutta et al. |
| 7,421,278 B2 | 9/2008 | Srinivasan et al. |
| 7,421,396 B2 | 9/2008 | Niwa |
| 7,451,005 B2 | 11/2008 | Hoffberg et al. |
| 7,589,628 B1 | 9/2009 | Brady, Jr. |
| 7,706,967 B2 | 4/2010 | Knockeart et al. |
| 7,797,530 B2 | 9/2010 | Moineau et al. |
| 7,809,601 B2 | 10/2010 | Shaya et al. |
| 7,847,684 B1 | 12/2010 | Brady, Jr. |
| 7,876,214 B1 | 1/2011 | Brady, Jr. |
| 7,876,215 B1 | 1/2011 | Brady, Jr. |
| 7,911,335 B1 | 3/2011 | Brady, Jr. |
| 7,995,996 B2 | 8/2011 | Link, II et al. |
| 8,060,525 B2 | 11/2011 | Svendsen et al. |
| 8,102,253 B1 | 1/2012 | Brady, Jr. |
| 8,427,303 B1 * | 4/2013 | Brady et al. ............. 340/539.11 |
| 8,680,985 B2 * | 3/2014 | Brady et al. ............. 340/539.11 |
| 2001/0034624 A1 | 10/2001 | Niwa |
| 2001/0049636 A1 | 12/2001 | Hudda et al. |
| 2002/0068585 A1 | 6/2002 | Chan et al. |
| 2002/0087266 A1 | 7/2002 | Sugimoto et al. |
| 2002/0091568 A1 | 7/2002 | Kraft et al. |
| 2002/1009091 | 7/2002 | Evans et al. |
| 2002/0178448 A1 | 11/2002 | Te Kiefte et al. |
| 2002/0183072 A1 | 12/2002 | Steinbach et al. |
| 2003/0006911 A1 | 1/2003 | Smith et al. |
| 2003/0009281 A1 | 1/2003 | Whitham |
| 2003/0009385 A1 | 1/2003 | Tucciarone et al. |
| 2003/0114171 A1 | 6/2003 | Miyamoto |
| 2003/0115203 A1 | 6/2003 | Brown et al. |
| 2003/0182567 A1 | 9/2003 | Barton et al. |
| 2003/0224776 A1 | 12/2003 | Meng |
| 2004/0003097 A1 | 1/2004 | Willis et al. |
| 2004/0036611 A1 | 2/2004 | Kidney et al. |
| 2004/0068552 A1 | 4/2004 | Kotz et al. |
| 2004/0070602 A1 | 4/2004 | Kobuya et al. |
| 2004/0077359 A1 | 4/2004 | Bernas et al. |
| 2004/0078813 A1 | 4/2004 | Kobuya et al. |
| 2004/0138906 A1 | 7/2004 | Fagan |
| 2004/0192346 A1 | 9/2004 | Chang et al. |
| 2004/0203852 A1 | 10/2004 | Janakiraman |
| 2004/0203860 A1 | 10/2004 | Fellenstein et al. |
| 2004/0236504 A1 | 11/2004 | Bickford et al. |
| 2005/0192025 A1 | 9/2005 | Kaplan |
| 2006/0047825 A1 | 3/2006 | Steenstra et al. |
| 2006/0064346 A1 | 3/2006 | Steenstra et al. |
| 2006/0069749 A1 | 3/2006 | Herz et al. |
| 2006/0195583 A1 | 8/2006 | Bellifemine et al. |
| 2006/0200258 A1 | 9/2006 | Hoffberg et al. |
| 2007/0067098 A1 | 3/2007 | Zelentsov |
| 2007/0093958 A1 | 4/2007 | Jonsson et al. |
| 2007/0185744 A1 | 8/2007 | Robertson |
| 2008/0042882 A1 | 2/2008 | Horstemeyer |
| 2008/0183376 A1 | 7/2008 | Knockeart et al. |
| 2009/0089184 A1 | 4/2009 | Boush |
| 2009/0287407 A1 | 11/2009 | Sheha et al. |
| 2011/0153186 A1 | 6/2011 | Jakobson |
| 2011/0173194 A1 | 7/2011 | Sloo et al. |

FOREIGN PATENT DOCUMENTS

| | | |
|---|---|---|
| WO | WO-9957863 A1 | 11/1999 |
| WO | WO-9959334 A1 | 11/1999 |
| WO | WO-0022860 A1 | 4/2000 |
| WO | WO-0175680 A1 | 10/2001 |
| WO | WO-0201405 A1 | 1/2002 |
| WO | WO-0221864 A1 | 3/2002 |
| WO | WO-0251079 A1 | 6/2002 |
| WO | WO-02085007 | 10/2002 |
| WO | WO-03075559 A1 | 9/2003 |
| WO | WO-03105463 A2 | 12/2003 |
| WO | WO-2004077784 A1 | 9/2004 |
| WO | WO-2004102925 A1 | 11/2004 |

OTHER PUBLICATIONS

Pages from www.itsa.org regarding Maptuit Corporation and go2 Local Business Registry, dated Apr. 18, 2002.

Pages from www.locationservices.autodesk.com regarding wireless point of location services, dated Apr. 18, 2002.

Dey, Anind K., Providing Architectural Support for Building Context-Aware Applications, Nov. 2000, A Thesis, Georgia Institute of Technology, Atlanta, Georgia.

Schilit, Bill N. et al., Context-Aware Computing Applications, 1994.

Bulletin of the Technical Committee on Data Engineering, Sep. 1996, vol. 19, No. 3, IEEE Computer Society, Washington, D.C.

Sumi, Yasuyuki et al., C-MAP: Building a Context-Aware Mobile Assistant for Exhibition Tours, 1998, ATR Media Integration & Communication Research Laboratories, Kyoto, Japan.

Fano, Andrew E., Shopper's Eye: Using Location-based Filtering for a Shopping Agent in the Physical World, 1998, Center for Strategic Technology Research, Northbrook, Illinois.

Dey, Anind K., et al., An Architecture to Support Context-Aware Applications, 1999, GVU Center, College of Computing, Georgia Institute of Technology, Atlanta, Georgia.

Bazinette, Vincent, An Intelligent Notification System, Jun. 12, 2001, IBM Research Report, IBM Research Division, Yorktown Heights, NY.

Cheverst, Keith, et al., Investigating Context-Aware Information Push vs. Information Pull to Tourists, 2001, Multimedia Research Group, Department of Computing, Lancaster University, Lancaster, United Kingdom.

Huang, Andrew C., et al., Pervasive Computing: What is it Good for?, 1999.

Chyi, Debbie, An Infrastructure for a Mobile-Agent System that Provides Personalized Services to Mobile Devices, May 2000, Dartmouth College Computer Science Technical Report TR2000-370, Hanover, New Hampshire.

Youll, Jim at al., Impulse: Location-Based Agent Assistance, 2000, MIT Media Lab, Cambridge, Massachusetts.

Marmasse, Natalia, et al., Location-Aware Information Delivery with ComMotion, 2000, MIT Media Laboratory, Cambridge, Massachusetts.

Schreiber et al., Dynamic User Profiles and Felxible Queries in Office Document Retrieval Systems, 1989, Elsevier Science Publishers B.V., North Holland.

Wang, et al., Location Aware Information Agent over WAP, Tamkang Journal of Science and Engineering, vol. 3, No. 2, pp. 107-115 (2000).

Fallon, Dublin Bus Tracking Service, Design and Implementation of a Device in Dependent Passenger Information System, Masters of Science in Computer Science dissertation submitted to University of Dublin, Sep. 2000.

Freytag, et al., Resource Adaptive WWW Access for Mobile Applications, Computers & Graphics, vol. 23, pp. 841-848 (1999), Elsevier Science Ltd.

(56) References Cited

OTHER PUBLICATIONS

Jensen, et al., Location-Based Services—A Database Perspective, Proceesings of the 8th Scandinavian Research Conference on Geographical Information Science, Jun. 25-27, 2001, As, Norway.

Imielinski, et al., Querying in Highly Mobile Distributed Environments, Department of Computer Science, Rutgers University, New Brunswick, New Jersey, Proceedings of the 18th VLDB Conference, Vancouver, British Columbia, Canada 1992.

Maass, Location-Aware Mobile Applications Based on Directory Services, Mobile Networks and Applications, vol. 3, pp. 157-173 (1998) Philips Research Laboratories, Aachen, Germany, Baltzer Science Publishers BV.

Vivacqua, Agents for Expertise Location, Software Agents Group, MIT Media Lab, AAAI Technical Report SS-99-03, 1999.

Madria et al., Data Organization Issues for Location-Dependent Queries in Mobile Computing, J. Stuller et al. (Eds.): ADBIS-DASFAA 2000, LNCS 1884, pp. 142-156, 2000.

Vlahakis et al., Archeoguide: First Results of an Augmented Reality, Mobile Computing System in Cultural Heritage Sites, Intracom S.A., International Symposium on Virtual Reality, Archaeology and Cultural Heritage (VAST), Nov. 28-30, 2001, Athens,Greece.

Markkula, Dynamic Geographic Personal Data—New Opportunity and Challenge Introduced by the Location-Aware Mobile Networks, Cluster Computing, vol. 4, pp, 369-377, 2001, Kluwer Academic Publishers, The Netherlands.

Duri, An Approach to Providing a Seamless End-User Experience for Location-Aware Applications, IBM Thomas J. Watson Research Center, Hawthorne, NY, 2001.

Kou-Chen Wu et al., "A Self-Served Mobile Location Query Service," IEEE, May 9, 2001.

Int'l Search Report and Written Opinion issued Jan. 12, 2015 in Int'l Application No. PCT/US2012/069572.

* cited by examiner

RESTAURANT PREFERENCE

| RESTAURANT STYLE | MEXICAN |
|---|---|
| DISTANCE | WITHIN 10 MILES |
| WHEN | WEEKENDS ONLY |
| PRICE | ENTREES UNDER $10-$12 |
| PARTICULAR ITEMS | CHIMICHANGAS |

*FIG. 3*

BILL'S PREFERENCE PROFILE

| ACTIVITY | INTEREST | DISTANCE | TIME |
|---|---|---|---|
| HANGGLIDING | | 20 MILES | ANY |
| | ANTIQUE GLASS | 5 MILES | ANY |
| GOLF | | 7 MILES | 6 a.m. TO 8 p.m. |
| SKIING | | 60 MILES | OFF |
| | FOOD: GERMAN | 10 MILES | 6 p.m. TO 8 p.m. |
| OUTDOOR SYMPHONY | | 15 MILES | ANY |
| BOWLING | | 1 MILE | OFF |

*FIG. 4A*

ALICE'S ATTIC PROFILE

| ACTIVITY | INTEREST | GOODS | SPECIALTY |
|---|---|---|---|
| | | ANTIQUES | DOLLS |
| | | ANTIQUES | PORCELAIN |
| | | ANTIQUES | GLASS |
| | | ANTIQUES | TAPESTRY |

*FIG. 4B*

REAL ESTATE PROFILE

| PRICE RANGE | $200,000-$250,000 |
|---|---|
| NO. BEDROOMS | 3 |
| NO. BATHS | 2 |
| LOCATION | WITHIN 10 MILES OF A TRAIN STATION |

*FIG. 5*

SYSTEM AND METHOD FOR NOTIFYING A USER OF PEOPLE, PLACES OR THINGS HAVING ATTRIBUTES MATCHING A USER'S STATED PREFERENCE

This application is a continuation of U.S. patent application Ser. No. 13/645,025, filed Oct. 4, 2012 which is a continuation of U.S. patent application Ser. No. 13/328,851, filed Dec. 16, 2011, now U.S. Pat. No. 8,427,303, which is a continuation-in-part of U.S. patent application Ser. No. 13/040,571, filed Mar. 4, 2011, now U.S. Pat. No. 8,102,253, which is a continuation of U.S. application Ser. No. 12/401,347, filed Mar. 10, 2009, now U.S. Pat. No. 7,911,335, which is a continuation of U.S. patent application Ser. No. 11/372,307, filed Mar. 9, 2006, now U.S. Pat. No. 7,589,628, which is a continuation in part application of U.S. patent application Ser. No. 10/609,961 filed Jun. 27, 2003, now U.S. Pat. No. 7,071,842, which claims priority based upon U.S. Provisional Patent Application Ser. No. 60/391,982 filed Jun. 27, 2002, the entireties of which are all hereby incorporated by reference.

FIELD OF THE INVENTION

The present invention relates generally to the field of communications systems and, in particular, to a system and method for providing localized resource information to mobile customers based on their explicit preferences that match profiles of media content about people, places and things.

BACKGROUND OF THE INVENTION

A global positioning system of satellites ("GPS") enables the tracking of objects on the surface of the earth through the use of satellites and receivers. In particular, the orbiting satellites of the GPS system each contain transmitters that send out radio frequency signals. GPS uses a pseudo-random data stream encoded on each satellite's carrier frequency. The receiver is synchronized with the data stream by matching an identical pseudo-random data stream with the data stream received from the satellite to give the distance to that satellite at the speed of light that the radio signal traveled. The receiver then triangulates its position using three or more satellites and by knowing where the satellites are by way of their particular data.

Stated another way, a GPS receiver receives tracking information from various GPS satellites via a GPS antenna. That information is transmitted in digital form from the receiver to a microprocessor that then makes the foregoing calculations. The information includes longitude, latitude, heading, velocity, time and elevation. The data can be processed and formatted as a data packet and immediately displayed, transmitted or stored in EEPROM until requested. Such GPS location-based information has enabled persons or vehicles equipped with GPS devices to be located, to locate their own positions, and/or to locate the best navigational paths to their destination with a great deal of accuracy.

Moreover, pursuant to recent federal emergency 911 legislation, cellular service providers must employ technology capable of locating the cellular phone within a certain distance range. This legislation was triggered by the fact that oftentimes when 911 calls were placed from a cellular phone moving away from the site of an emergency, by the time that the position of the caller was estimated using the then current technology, and by the time that the emergency vehicles were dispatched in response thereto, the caller may have traveled a significant distance from the site of the emergency. Hence, valuable time was often lost by the emergency vehicles in attempting to locate the parties in need of assistance. The ubiquitous nature of such technology enabling the determination of the accurate geographic location of a mobile user has made it feasible to provide location-based information to the mobile user while the user is literally in transit.

While other systems have attempted to use such GPS position information to provide location-based information, such as advertisements or coupons for local businesses, one shortcoming with the current systems is that they provide information or offers that are only of a general interest. Accordingly, they often target a large number of people with the hopes that a certain percentage of the recipients will favorably respond, as opposed to serving the particular, more exacting preferences of a specific recipient. An example of such general public messages is a broadcast message, or a wireless E-mail message or a cellular call to anyone within a certain geographical radius of a fast-food merchant that offers a reduced price offer for a limited time. Such general interest, location-based messages run the significant risk of annoying a recipient that is not interested in the messages or offers. As a result, the message may either be ignored by the recipient or serve to create a negative opinion about the merchant with respect to future purchasing decisions. Use of such general messages may also serve to create a negative opinion about the service provider as well. Likewise, other location-based information providers such as Vindigo and Go2 function much like mobile "Yellow Page" directories in response to specific requests for particular types of business in a certain locality by the traveler. However, such services are typically only provided on a traveler-initiated basis prompted by a specific request.

Other services like On-Star® provide location-based information in response to traveler-initiated requests related to roadside assistance, security or other such traveler support services. Other systems such as Lojac® have monitored or tracked the movement of specific assets such as vehicles—and reported the location of the vehicle to the police or owner when stolen. However, none of these location-based information providers are believed to specifically tailor such attribute-based and location-based information to the specific expressed profile or preferences of the mobile traveler that will receive such information.

Other systems have sought to use purchasing interest profiles of the user. For example, the system for providing navigational services of Lee et al., U.S. Pat. No. 6,374,177 contains user profile databases, billing information and a purchasing interest profile. Accordingly, information in advertising databases can be compared against a user's purchasing interest profile through an adaptive profiler, so that advertisements inserted into personalized digital broadcasts mesh with that user's past buying history. Likewise, the prior system of Adaptive Personalization provided an adaptive recommendation engine that analyzed the information that individual users accessed on the mobile devices. Based on the accessed information, the recommendation engine prioritized information for mobile applications provided to that user. A significant problem with these systems is that they rely at most on an inferred or extrapolated preference of the user based on prior behavior or patterns of behavior, rather than explicitly asking the user for preferences. Accordingly, such systems do not address situations wherein the preferences of the user change or where the user has not previously been interested in a particular service or good.

These systems also do not provide a system that is both location-based and preference-based to provide information to a mobile user or consumer by matching the preferences of the person, place or thing (e.g., a merchant) and the user, so as to target a user based on a stated, rather than interpreted, preference. Furthermore, these systems do not allow the merchant or other entity to reach users at a time and place when they are most likely to purchase its goods and/or services.

Additionally, because of the mobility of individuals today and the number of different businesses and entities that provides goods and/or services, there is a need to obtain pertinent information in a timely fashion to allow the user or consumer to be aware of the available options in a local area that meet his or her preferences. Typically, individuals rely on word of mouth from friends or carry guidebooks for a particular region. However, both of these options have problems. As for word of mouth, people have different tastes and opinions. Accordingly, there is no guarantee that an individual will like the same things as his or her friends. Furthermore, by limiting the options to only one or two choices, the users are missing out on opportunities to try places, etc. that meet their specific preferences. Guidebooks, on the other hand, provide information on more places; however, guidebooks must be carried around by individuals and do not describe all of the places within a particular region. Additionally, guidebooks do not provide up-to-date information so there is no guarantee that the information contained in the guidebook is accurate. Guidebooks also do not provide an easy way to determine which places are within a desired range from the user's current location.

Therefore, there is a need to produce and offer a dual-preference matching system and method that provides a system that is both location-based and preference-based to allow for a user to obtain information about those persons, places and things that match the user's preferences and are within a prescribed range.

SUMMARY OF THE INVENTION

The present invention is an improvement over conventional means for providing information to users in that the system and method for providing information, which is accessible by the user, based on a location-based and preference-based system that matches the specific expressed interests and preferences of a user with the profile of a person, place or thing is unique and an improvement over the prior art. In particular, the present invention enables the user to enter and update its preference information for a wide variety of goods, services and interests to allow the user to be notified of only information on those persons, places and things that expressly match up with the user's stated preferences. When notified of the express matches, the user may then obtain additional information regarding the expressed matches. The information may be from a variety of sources such as books or web-based content. A publisher or other entity may therefore supply or publish its information for access by a user of the system.

In operation, a user will create a preference portfolio for various types of persons, places and/or things preferably through the use of a wireless device that has GPS capabilities. The preferences may include additional information such as: a distance range from the user, price, period of interest and the like. Persons, places and things may likewise create their own profiles on the system to list their goods, services, attractions and the like. Additionally, the information that is provided to the users may include information on a variety of events such as, but not limited to, concerts, sporting events, special appearances, exhibitions, demonstrations and the like. The system of the present invention thereafter accesses and reads the profiles of the persons, places and things to compare the user's preferences on the wireless device. If any of the persons, places or things match-up with the expressed preferences of the user, then the user will be notified of those persons, places and things. The user may thereafter, if interested, request additional information about the person, place and/or thing. Additional information may include, but is not limited to directions from the user's current location, photographs, menus, reviews and/or information from guidebooks and other content providers. Additional information may be directed to places related to, among other things, travel, history, Americana, culture, outdoor and adventure, heritage, arts and leisure, and transportation.

Information provided to the user may also be in the form of media content concerning people, places and things that match the user's expressed preferences and are within a prescribed geographic area. In operation, details of any matches may be provided to the user for selection. Alternatively, any matches may be prioritized based on a further level of interest indicated by or determined about the user. Once ranked, the prioritized matching media content may be automatically played on the user's device.

The present invention is also directed to a process that transforms literary works into digital works or publications and which embeds location information into the works. A universal reader application may then be used to dynamically and otherwise interact with the embedded information routinely and/or automatically, thereby allowing, among other things, a distance result to be displayed in any and all places in the guide where the markup language has embedded geospatial coordinates.

It is therefore an object of the present invention to provide a new and improved matching system and method that allows users to obtain notice of and information about their expressed favorite or desired types of people, places and/or things as they travel.

It is another object of the present invention to provide a new and improved matching system and method that uses the exact, stated preferences of the users to allow information to be specifically targeted to users who are the most interested in the information.

Still another object of the present invention is to provide a new and improved system and method for providing information on people, places and/or things that match a user's explicit preferences and are within a prescribed distance from the user.

It is yet another object of the present invention to provide a new and improved matching system and method that allows mobile users to use the system by way of multiple platforms.

It is still yet another object of the present invention to provide a new and improved matching system and method that is capable of working with real-time GPS location-based systems as well as pre-loaded mapping software.

Yet another object of the present invention is to provide a new and improved matching system and method that is capable of using a variety of communications media.

Still another object of the present invention is to deliver timely, in-depth information about people, places and things nearby that match a user's explicit preferences.

Other objects, features and advantages of the invention will be apparent from the following detailed disclosure, taken in conjunction with the accompanying sheets of drawings, wherein like reference numerals refer to like parts.

BRIEF DESCRIPTION OF THE DRAWINGS

FIG. 3 is an example of a user preference profile for restaurants.

FIG. 4A is an example of a user preference profile including, among other things, antique items that the user is interested in.

FIG. 4B is an example of a merchant profile listing the types of products that the merchant offers for sale.

FIG. 5 is an example of a user real estate preference profile.

DETAILED DESCRIPTION OF THE INVENTION

Figure 1:
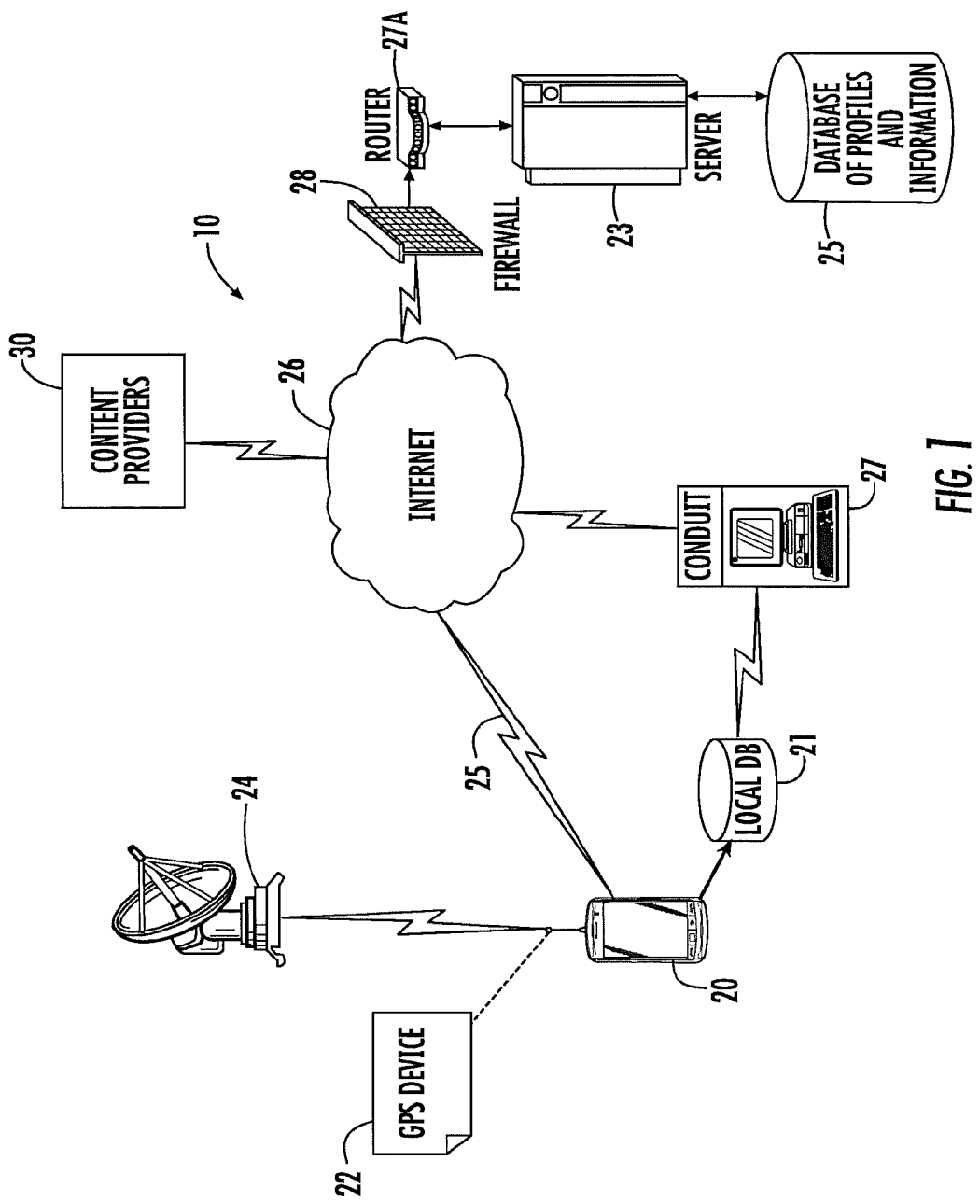
FIG. 1 is a block diagram illustrating an embodiment of the invention showing a PDA connected to a GPS system, a content provider connected to the Internet, and a server through the Internet for accessing a database of profiles and information.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

Referring now to the drawings, and particularly to FIG. 1, there is shown a preferred embodiment of the hardware components needed for the preference matching system of the present invention. The preference matching system, generally designated by the number 10, is shown as having a mobile device such as personal digital assistant ("PDA") 20, a remote server 23 containing or capable of accessing a database of merchant profiles 25; one or more content providers 30 capable of submitting information over the Internet; and a GPS base station and antennae/satellite dish 24 for communicating with the GPS satellites (not shown). It is appreciated that the mobile device of the present invention may communicate and receive location-based information from the GPS satellites in any known way. It is also appreciated that the content providers may provide information for access by the PDA or other mobile device in any other known way and not depart from the scope of the present invention. For example, it is appreciated that the information may be inputted, exported or downloaded to the database 25 or a separate database or computer. While the profiles 25 are generically described as merchant profiles, it is appreciated that the profile may be for any entity that is interested in providing information to a user (e.g., a person, museum or other place). Examples of such entities include, but are not limited to, merchants, operators, property owners, real estate brokers, managers, park district managers, individuals, and rangers. Additionally, the information that is provided to the users may include information on a variety of events such as, but not limited to, concerts, sporting events, special appearances, exhibitions, demonstrations and the like.

Examples of a PDA are a Pocket PC® Microsoft Windows CE® operating system based PDA, a Palm®, Handspring®, Sony®, other Palm® Operating System based PDA, or other handheld devices capable of receiving digital information such as the Linux® Operating System based Sharp® Zaurus. While a PDA is shown and disclosed, it is appreciated that the wireless device may be any of the known wireless devices including, but not limited to, a wireless-enabled notebook computer, a 2-way pager, a cellular phone, or an integrated vehicular navigational device. The PDA preferably has a local database 21 stored in on-board RAM or ROM such as memory cards so as to contain the preferences of the user and/or the profiles of the merchants or other points of interest along a selected route or within a specified vicinity of the user. It is also appreciated that the user preferences may be stored on the server or elsewhere and not depart from the scope of the present invention. The PDA also preferably has GPS capabilities so as to be capable of determining its geographic position by receiving and interpreting the signals of the GPS satellites. It is appreciated that the PDA may contain or work in cooperation with a GPS receiver component 22.

It is appreciated that the server 23 may be capable of being accessed wirelessly through a wireless connection (25); by non-wireless connection by way of conventional modem by the PDA via telephone line and ISP to the Internet 26; or by a land-line connection to a computer 27 with TCP/IP access to the Internet 26. A router 27A and firewall 28 are preferably interposed between the Internet and the server for security purposes. It is appreciated that other security measures and devices may be used and not depart from the scope of the present invention. A server farm is preferably used for the proprietary socket server (both clustered and redundant), as well as for web serving the application's user interface (both clustered and redundant).

While it is appreciated that a wide variety of software may be used, the preferred software is: portable GPS receiving software such as NMEA 0183 Protocol supported software; a profile matching application; Berkeley/Winsock socket server software for both the wireless device and the non-wireless device embodiments; TCP/IP access software; COM/DCOM or J2EE Compliant web server software; and an ANSI/ISO SQL database management system such as an SQL server 2000 or an Oracle® 9i database management system. The server farms for the socket server preferably run Windows® 2000 Advanced Server or better and Linux® or Solaris with J2EE web application software.

Figure 2:
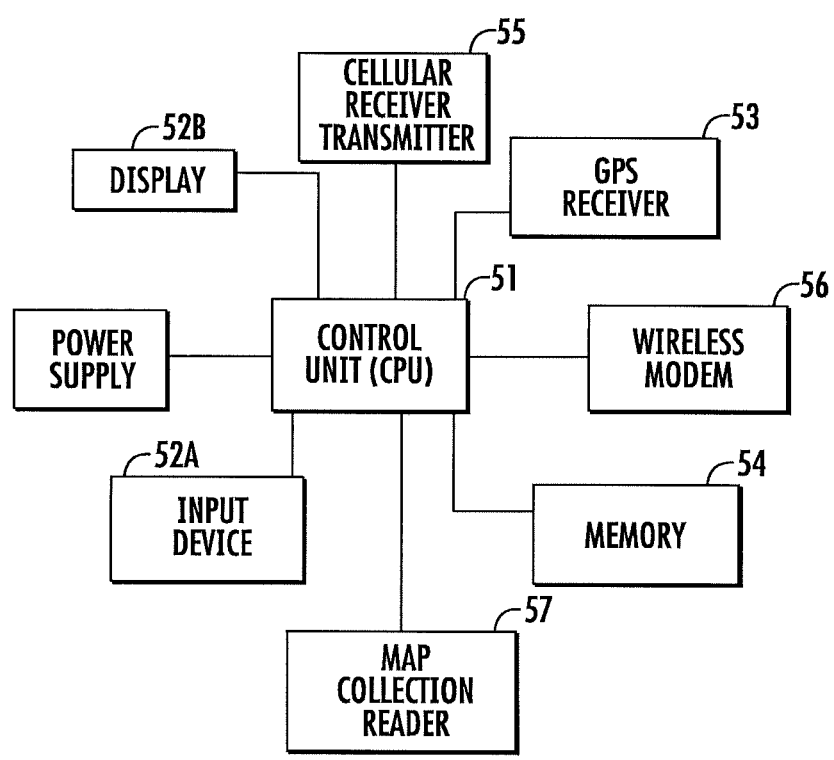
FIG. 2 is a schematic view of one embodiment of a PDA of the present invention.

Referring now to FIG. 2, the preferred hardware for a PDA for use in the present invention is shown. The PDA preferably includes: a control unit including a CPU 51; an input/output system (I/O system) 52A and 52B controlled by the CPU 51; a location determination system such as a GPS receiver 53 and associated software; on-board memory 54 for data storage; a cellular receiver and transmitter 55; a wireless modem 56 or hardwired modem (not shown) for accessing the Internet; and a map collection reader 57 that can be in CD or DVD form or some other suitable readable storage media. The I/O system of the PDA preferably includes an input device 52A and a display 52B such as an LCD screen to interface between the user and the PDA. The input device 52A may be, but is not limited to, a touch pad, an on-screen keyboard, a touch screen, a mouse, or a speech recognition device. The board memory 54 for storing the personalized information of the user and/or the profiles of the merchants and points of interests may be, but is not limited to, EPROM, flash memory, disk drive, or other suitable recordable storage media.

If a wireless TCP/IP or similar connection is available for the PDA, the PDA can download the requisite user preference profile and/or person, place or thing (heretofore, generically referred to as a merchant) profile information in real time from the remote server. If a connection is not available, then the requisite user profile and/or merchant profile information can be preloaded or downloaded into the Local Database or a separate database of the PDA at a time when such a connection is available.

Merchant information may include, but is not limited to: the type of business or location; the price ranges of the products and/or services that it provides; the hours of operation; the types of users it is most interested in reaching; its location; and a description of the products and services provided. Additionally, it is appreciated that the merchant may also include keywords that detail or describe specific products, services or features that the merchant offers. In the preferred embodiment, it is appreciated that the merchant may purchase such keywords from the system operator in order to enhance its listing.

The system and method of the present invention thereby allows users to indicate their preferences with respect to such information as, but not limited to: the type of merchant, goods, services and the like they are interested in. Additionally, the users may also include specific parameters to limit the amount of information received. Examples of parameters that may be used include, but are not limited to, the time periods during which the users are interested in such merchant (e.g., only on weekends or only at night); the price ranges that the users are willing to spend; specific type of products, services, attractions or the like that the merchant has to offer; and the maximum distance that the user is willing to travel. It is appreciated that users and merchants may enter their preferences into the system in any known way, including but not limited to, using a series of hierarchical menus on the Internet, the PDA, or the like, that have a plurality of possible preference selections for a variety of topical categories. While it is appreciated that the geographic location of the merchant may be calculated in any number of ways, it is preferred that a mapping service will calculate the longitude and latitude of an address that is inputted by the merchant.

Referring to FIG. 3, an example of a user preference profile for food is shown. It is appreciated that the example of the user profile shown and disclosed is merely one example of the type of information that may be entered or contained in a user profile and that the present invention is not limited to any one embodiment. As seen in FIG. 3, the user has indicated that he likes Mexican food, but only on the weekends and places that are within 10 miles of his location. Additionally, the user has indicated that he prefers restaurants where the entrees are not more than $10-$12 each and where the restaurant offers chimichangas. Accordingly, the system and method will compare the preferences with the merchant profiles and only send messages to the user from merchants that meet those preferences. The system and method thereby provide for a targeted advertising system that permits, on one hand, merchants to target those users who are the most likely to purchase their goods and/or services and users, on the other hand, to only receive information that is related to their interests or preferences. By allowing the users to select or input specific items or details about their preferences and interests, the present invention will allow the users to be able to select places that are of the most interest to them. Additionally, the system will provide merchants who meet the user's stated preferences even if the user would not normally consider that restaurant (e.g., Bob's Diner may also offer chimichangas for $7.99).

Referring to FIGS. 4A and 4B, an example of a user preference profile and a corresponding merchant profile are shown. FIG. 4A shows a user preference profile for a user named Bill that lists a number of activities, interests and preferences that he is interested in. Particularly, the user has indicated that he is interested in hanggliding at any time within a twenty mile radius of his location; antique glass at any time within a five mile radius; golf between the hours of 6 a.m. and 8 p.m. and within a seven mile radius; German food between 6 p.m. and 8 p.m. that is within a ten mile radius; and the outdoor symphony at any time within a fifteen mile radius. The user has also indicated that he is interested in skiing and bowling, but has currently turned off those preferences so he will not get any offers or messages related to those services. It is appreciated that the user may repeatedly modify the user's preference profile at any time. Accordingly, in the example shown in FIG. 4A, the user may turn off the preference profile hanggliding in the winter and activate the preference profile for skiing. Referring to FIG. 4B, a merchant profile for Alice's Attic is shown. The proprietor of Alice's Attic has indicated that she sells antique dolls, antique porcelain, antique glass and antique tapestry. Accordingly, if Bill passes within five miles of Alice's Attic, the system will match up Bill's preference for antique glass with Alice's Attic's products and notify Bill that Alice's Attic sells antique glass. Bill may then select the direction option to obtain directions and follow the provided route to the store.

It is also appreciated that the present system may work with real estate. In particular, it is appreciated that homeowners, real estate brokers and the like may list homes on the system, whereby when the listed homes match the preferences of the user, the user will be notified of the home to allow it to drive by and look at. For example, a user may enter preferences related to the type and location of houses that it is interested in. Referring to FIG. 5, an example of the preferences of a user is shown. The user has indicated that it is looking for a house having at least three bedrooms, two baths, is priced between $200,000 and $250,000 and is within 10 miles of a train station. As the user travels, it will accordingly be notified of any homes listed on the system that meet its preference criteria. Additionally, it is appreciated that the user may also interact with the system to determine the average real estate prices for a particular type of housing or building in the area in which the user is traveling.

Figure 6:
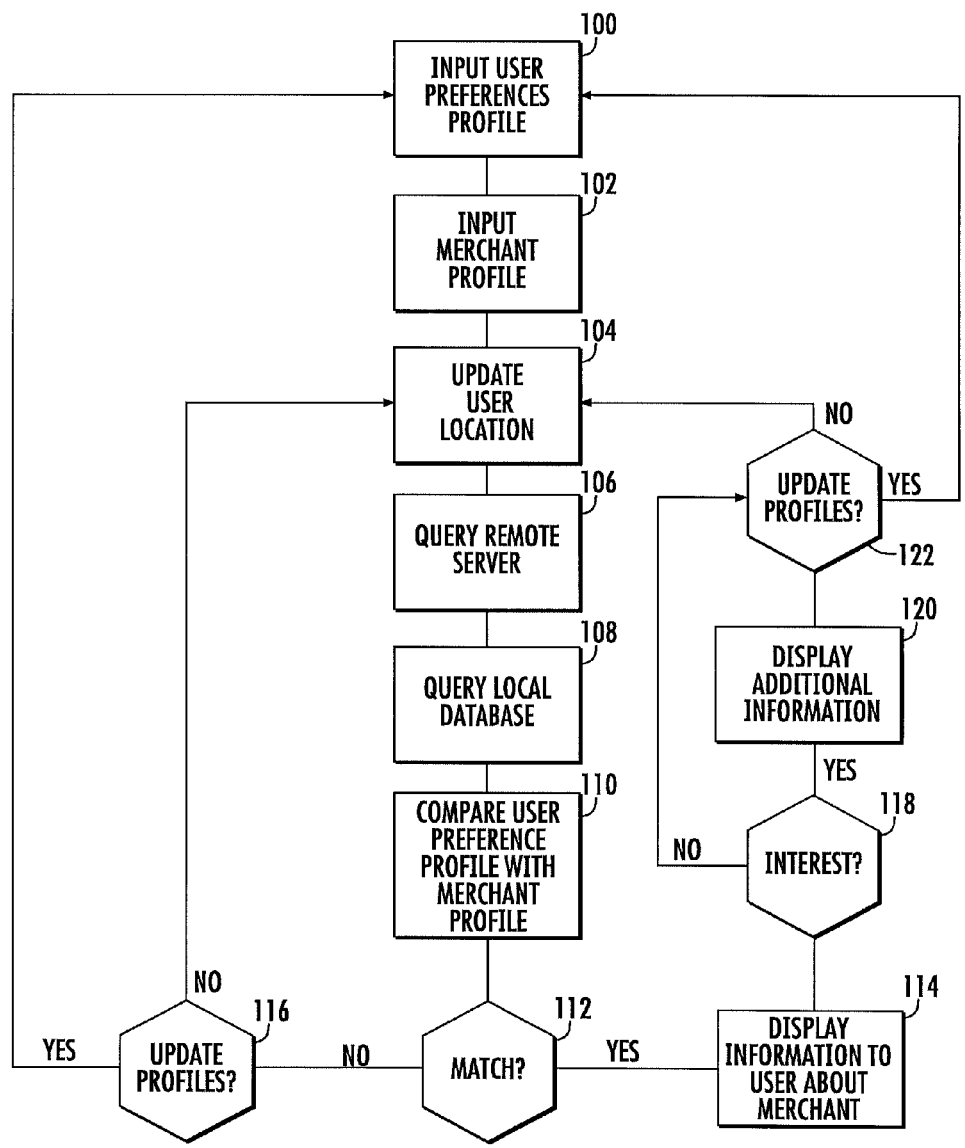
FIG. 6 is a flow chart diagram of the steps involved in matching the preferences of a user with a merchant's profile for one embodiment of the present invention.

Referring to FIG. 6, the preferred steps in matching the preferences of a user with those of a merchant are shown. After the user and merchant enter their preferences and profiles in steps 100 and 102, the GPS receiver 22 calculates the user's current position in step 104. The remote server 23 is then queried as to the locations and characteristics of the listed merchants and/or places of interest in step 106, while the local database 21 is queried with respect to the stated preferences of the user in steps 108. The software then compares the coordinates of the current location of the user, the preferences of the user and the profiles of the merchants to determine if there is a match in step 110. While various methods may be used, the "Great Circle" equation is one example of a method for determining the distance between the place and the user, based on the distance between two points on a sphere. If the merchant matches the preference of the user in step 112, and the merchant is within the distance range selected by the user, then the user is notified of the merchant in step 114. Otherwise the user may elect to update its user preference profile in step 116, wherein the process would be repeating starting in step 100. Otherwise, the system will continue to monitor the user location in step 104 and continue the matching process.

Referring again to step 114, notification of the merchant may include information pertaining to the merchant's business, products and/or services, as well as directions to the merchant. If the user indicated he or she is interested in the merchant in step 118, the user may request more information, if desired or necessary, in step 120. The user may then elect to update its user preference profile in steps 122, wherein the process will be repeated starting in step 100. It is appreciated that the merchant profile may also be updated by the merchant at any time. Otherwise, the process restarts in step 104.

Figure 22:
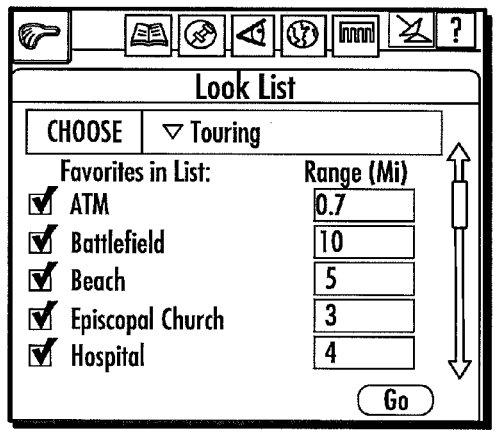
FIG. 22 is a screen shot illustrating a list of possible places for matching in accordance with the present invention.
Figure 24:
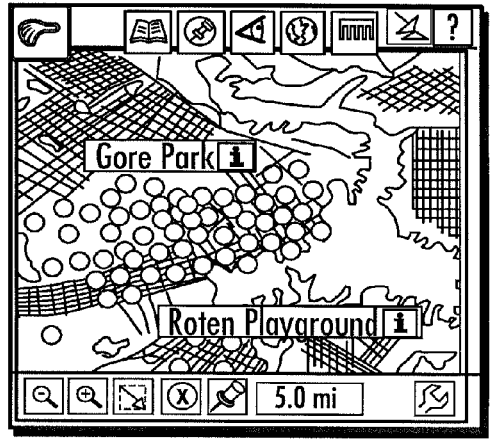
FIG. 24 is a screen shot of a map displaying the places that match the user's preferences set in FIGS. 22 and 23 in accordance with the present invention.
Figure 23:
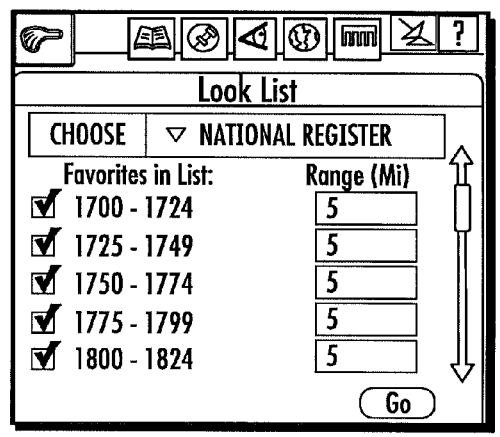
FIG. 23 is a screen shot showing data fields for use in inputting preferences for historical places of particular time periods in accordance with the present invention.

It is appreciated that the information requested in step 120 may be from a variety of content providers including publishers of guidebooks and other travel materials. Information that may be provided may include, but is not limited to, narratives about the particular merchant from a publisher or other user, reviews, photographs or hypertext links. Additionally, referring to FIGS. 22 through 24, it is appreciated that the system may also include information regarding persons, places and things not normally covered by the guidebooks or other content providers. Examples of such information includes, but is not limited to, locations for particular stores, attractions, historical sites (which may be further categorized by, among other things, time period as shown in FIG. 23, or by relation to a particular event), public facilities (e.g., libraries, post offices, hospitals, churches, and/or ATMS) and natural features (e.g., lakes, summits, beaches and/or trails). For example, in a preferred embodiment, the system may contain over 50,000 buildings from the National Register of Historic Places, including information about the year the building was constructed, the name of the architect, and the significance of the site.

Figure 19:
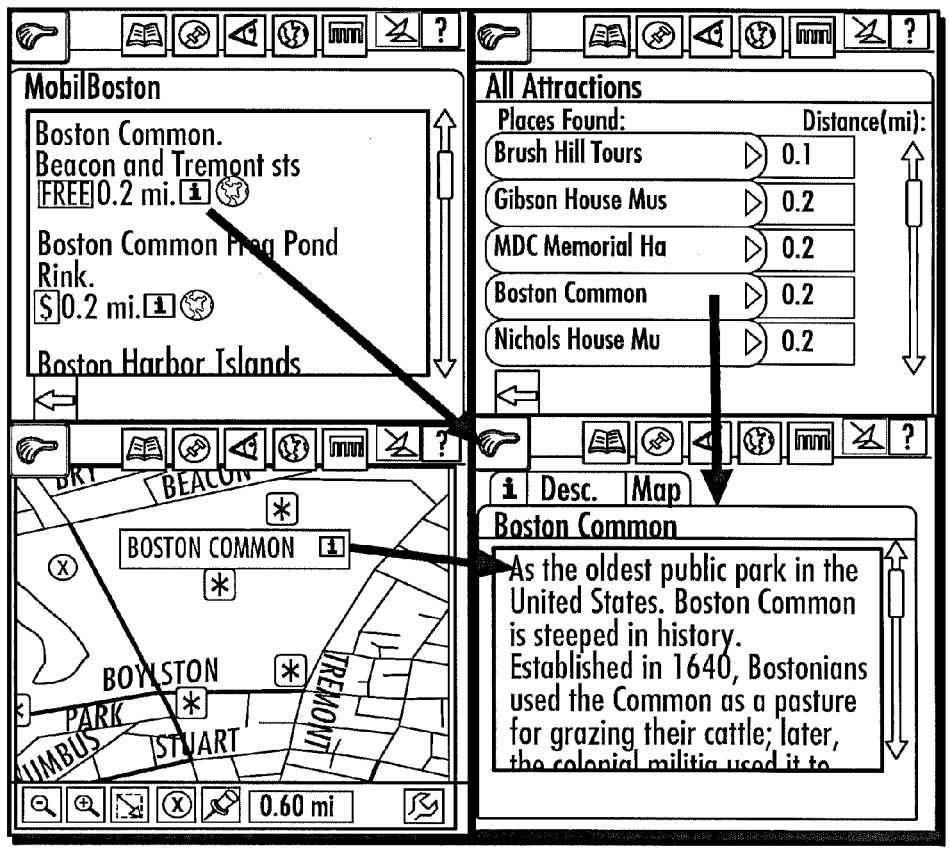
FIG. 19 illustrates four screen shots showing how information on places may be selected in accordance with the present invention.

In a preferred embodiment, the additional content information may be accessed by a user by clicking on a particular listing, icon or link. Referring to FIG. 19, a plurality of screen shots are shown illustrating the different ways that a user may be able to access the additional content information. In the upper left screen shot, a user may click an icon associated with the results to obtain the narrative information shown in the bottom right screen shot. Alternatively, the user may click on the name of the location or other match as shown in the upper right screen shot, or may click on an icon located on a map as shown in the lower left screen shot. It is appreciated that if the content information does not fit on one screen, the user may scroll down in a known way. Links or means to obtain additional content information, or to supply one's own comments, may also be included in the information output.

Figure 7:
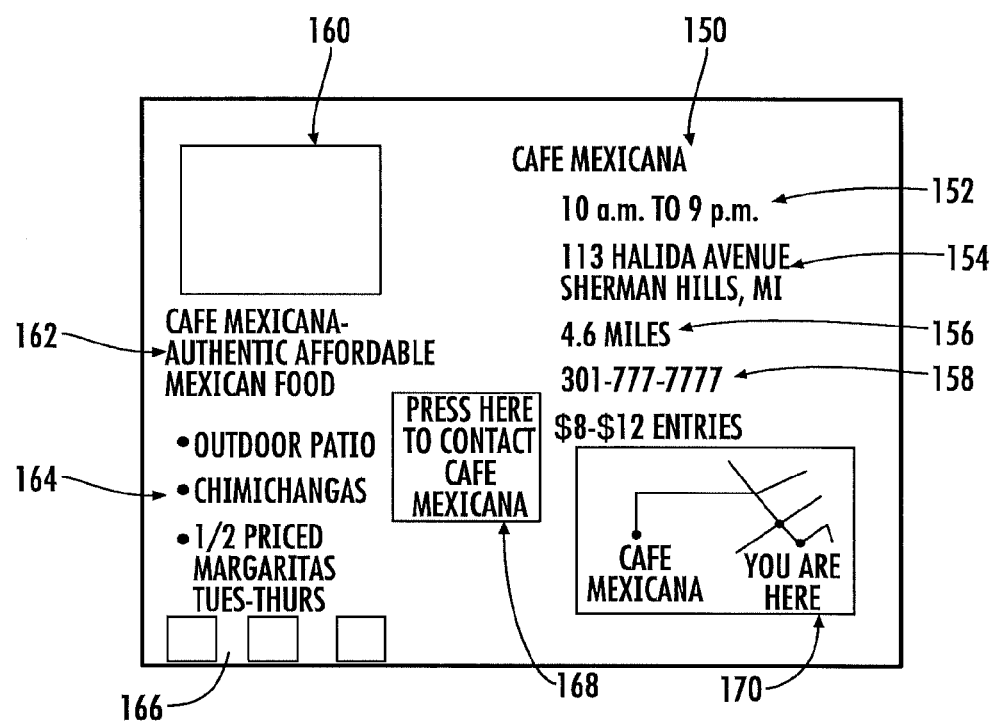
FIG. 7 is an example of one embodiment of screen display of a PDA showing information of a merchant that matched the user's preferences.

FIG. 7 illustrates one example of a screen display for the PDA of a match found by the system. In the preferred embodiment, when a match is found, the PDA 20 will display various information about the place that match the user information. Examples of the information that may be displayed in various data fields or the like include, but are not limited to, the name of the merchant 150, the hours of operation 152, the street address 154, the current distance 156 from the user, the phone number 158, an image 160 of the merchant, a tagline 162 and any keywords 164. For example, referring back to the user preferences inputted for Bill in FIG. 3, information pertaining to a Mexican restaurant matching Bill's stated preferences is shown. The restaurant, Café Mexicana, is shown as being 4.6 miles away with meals that range from $8 to $12. Additionally, the keywords section 164, in addition to indicating that it has an outdoor patio, indicates that the merchant also offers chimichangas. It is also appreciated that the screen display may include buttons or information 166 pertaining to ratings, reviews, write-ups from guidebooks or other resources material, seals of membership, certificates and the like, or a button 168 that allows the user to communicate with the merchant, among other things, make inquiries or reservations. The seals of membership and certificates may be used to provide a mechanism to allow the users to feel more confident to visit the merchants that match their preferences. The screen display may also include directions to the place and/or a map 170 that shows the current location of the user and the merchant's location. Clicking on the map may provide the user with specific directions based on the user's current location as calculated by the GPS system. While the screen display includes the above-identified information organized in a particular way, it is appreciated that the system may produce screen displays having different or additional information that may be organized in any number of ways and not depart from the scope of the present invention.

Figure 8:
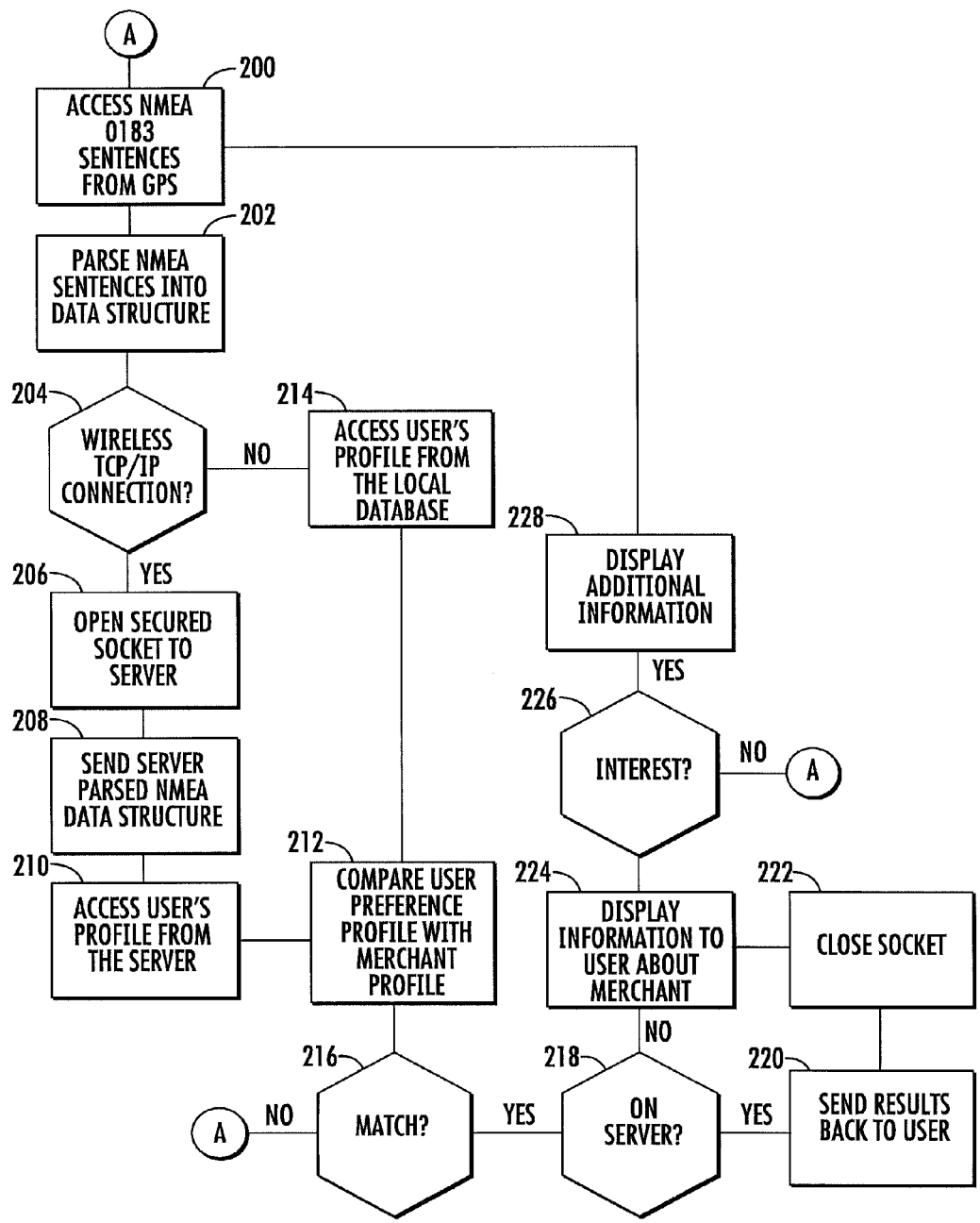
FIG. 8 is a flow chart diagram of the technical steps involved in matching the preferences of a user with a merchant's profile for one embodiment of the present invention.

Referring to FIG. 8, a flow diagram of the preferred technical steps in one embodiment of the present invention is shown. In operation, a GPS device provides position data in the form of NMEA 0183 sentences. Software programs may be used as averaging programs to collect and average multiple GPS Latitude/Longitude readings in an effort to produce an accurate location, as well as altitude, direction and speed. Such programs may also display satellite position, elevation, angle, signal level and most everything else that is available from the NMEA sentences. The NMEA 0183 sentences are preferably accessed from the GPS device and parsed into a useable data structure in steps 200 and 202. If it is determined in step 204 that a wireless TCP/IP connection to the Internet or a network associated with the remote server is used, then an open secured socket is established in step 206. The parsed NMEA data structure may then be sent to the server in step 208, whereby the user's profile may be accessed from the remote server database of profiles in step 210. The server database of profiles may then be queried for merchant locations matching the specified user profile and distance limits in step 212.

On the other hand, if a suitable TCP/IP connection to the Internet of a network associated with the remote server is not available, then the user's profile is accessed from the local database of the PDA in step 214 for merchants matching the specified user profile and distance limits. Accordingly, the matching in this case will occur based on preloaded user and merchant profile information contained in the local database of the PDA as opposed to the matching process taking place on the remote server.

Depending on where the information is stored, either the local database or the remote server database will then be queried in step 216 as to whether the merchant is of the type preferred by the user. In particular, the database may be queried as to whether any merchant is within the specified distance limit of the user profile; and whether any merchant profile and/or keywords match the user's preference profile. If it is determined that the merchant is of the type preferred by the user, and it is determined in step 218 that the matching process is operating on the remote server, then the results are sent back to the client in step 220. Thereafter, the socket is closed in step 222, and the results are displayed on the PDA to the user in step 224. If, on the other hand, the matching process is not running on the server, but instead is running locally at the PDA, then the results are displayed to the user at the PDA in step 224.

Figure 17A:
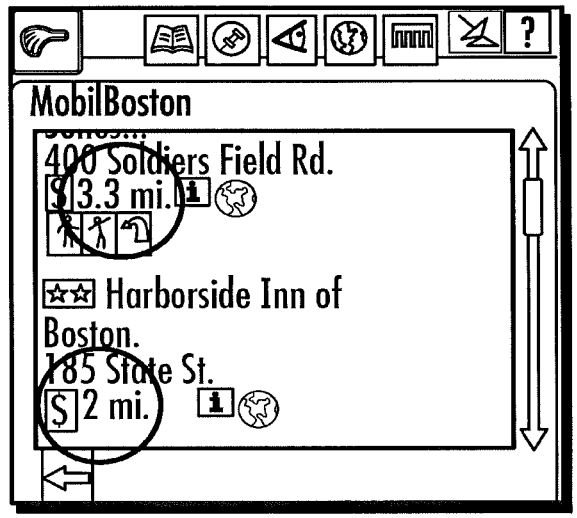
FIGS. 17a and 17b illustrate a pair of screenshots illustrating the dynamic updating of the relative location of the listed items.
Figure 17B:
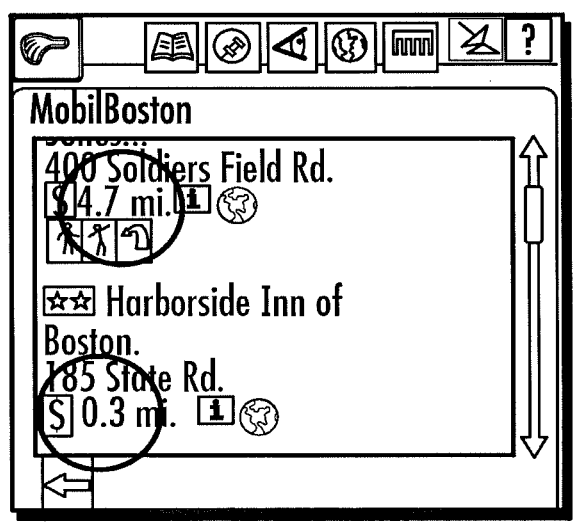
Figure 18:
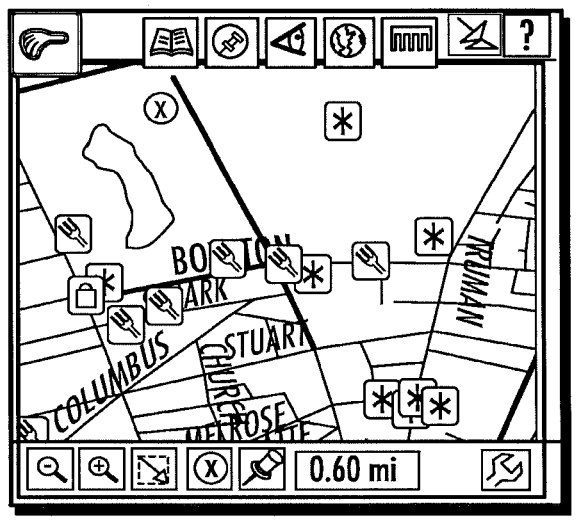
FIG. 18 is a screenshot illustrating a map displaying the matches of the user's preferences in accordance with the present invention.
Figure 21:
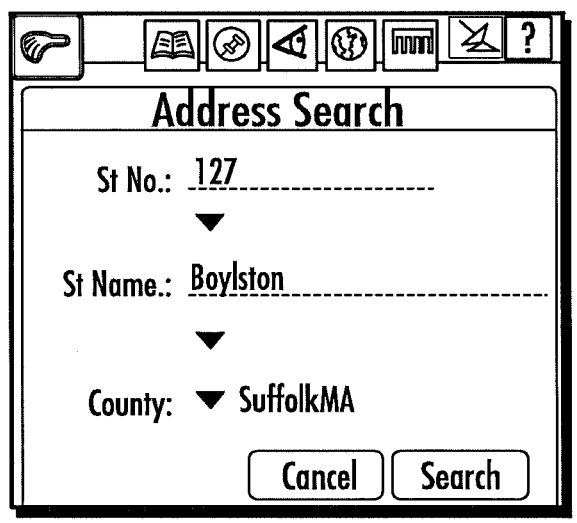
FIG. 21 is a screen shot showing data input fields for providing a geographic location in accordance with the present invention.
Figure 20:
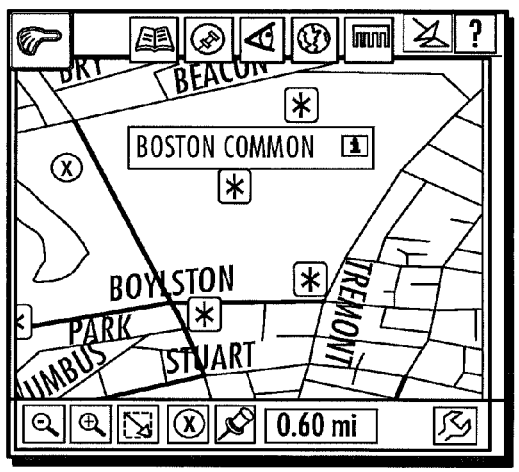
FIG. 20 is a screen shot illustrating a map displaying the name of a location in accordance with the present invention.

The system also preferably dynamically updates the output based on the current determined location of the user and the relative distance to the particular merchants. In other words, as the user moves, the output changes to reflect the current distance to the matched location. Referring to the example shown in FIGS. 17a, 17b, the output for the matched hotels has changed based on the movement of the user (e.g., the distance from the user to the Harborside Inn of Boston changed from 2 miles to 0.3 miles). The locations shown in the maps also preferably are dynamically updated as well. Accordingly, as the system determines the location of the user, the map may move to reflect the current position, as shown in FIG. 18. Additionally, it is appreciated that the user may input a particular location using: a tap-screen marker, a keypad or other input device for entry into data fields as shown in FIG. 21; or other input means to determine what matched locations are around a particular area that they may travel to. In a preferred embodiment of the system, the maps are easily panned and zoomed for providing information to the user. Street names and locations names may also be displayed by tapping on the street or location as shown in FIG. 20.

If the user indicates any interest in the displayed place in step 226, then additional merchant information such as, but not limited to, narratives and pictures from content providers (e.g., a publisher of a guidebook) and reviews may be transmitted and/or displayed to the user. Additionally, directions to the merchant location from the user's position may be provided and/or additional information such as, but not limited to, hours of operation or sales may be provided. Or, if it is a historical site, information related to its history and/or historical importance may be displayed. If no interest is shown in step 226, then the process restarts in step 200, preferably after a one second threaded pause. It is appreciated that the user and/or merchant may also preferably update their preference profiles at any time.

Revenue may be generated in a number of ways from the present invention. Merchants can be allowed to list themselves for free in the system in the appropriate categories of businesses, products, services, attractions, places and the like. While it is preferred that the merchants may list themselves for free, it is also appreciated that they may pay for their initial listings as well. In addition to the initial listing, the merchants may also enhance their listing by purchasing "keywords" that may increase the chances that passing travelers using the system will be notified of the location of the merchant because of a match between the user's preference and the merchant's profile and/or keywords. Cellular phone service and other wireless service providers may also be licensed or charged to allow for the system of the present invention to be available to their subscribers. Furthermore, publishing companies, such as newspapers and phone directory publishers who normally sell ad space, can receive a commission based on the revenue generated from the sale of keywords to operators or managers of the places that list their attributes in the form of their profile. Furthermore, content providers can receive compensation for each time their information is accessed by a user, or a user may purchase rights to the content for a particular location and/or period of time. For example, if a user is traveling to New York for a week, the user may purchase information from a guidebook publisher pertaining to New York for use for that particular week's time. At the end of the week's time, the system will prevent the user's from accessing the information until an additional license is purchased.

It is also appreciated that chains of business may also be able to offer their members the benefit of a lower fee. Entities such as governmental agencies or tourism boards could also be charged for expanded information on particular places so as to encourage increased numbers of visits to such places by travelers. It is further appreciated that the places may remit a percentage of all sales from the matching system to the operator of the system of the present invention.

It is appreciated that the system may work with both real-time GPS location-based systems, and pre-loaded mapping software such as DVD-based "in-dash" navigational systems available on many high-end automobiles. While GPS positioning is described herein as an example of one possible method for determining the location of the user, other forms of locating systems and method such as through triangulation using the distance between radio towers should also be considered as being within the scope of the present invention. Furthermore, it is appreciated that the system may work with remote units without GPS and no wireless connection that maintain a live cellular or a data network link (e.g., a Blackberry).

Figure 9:
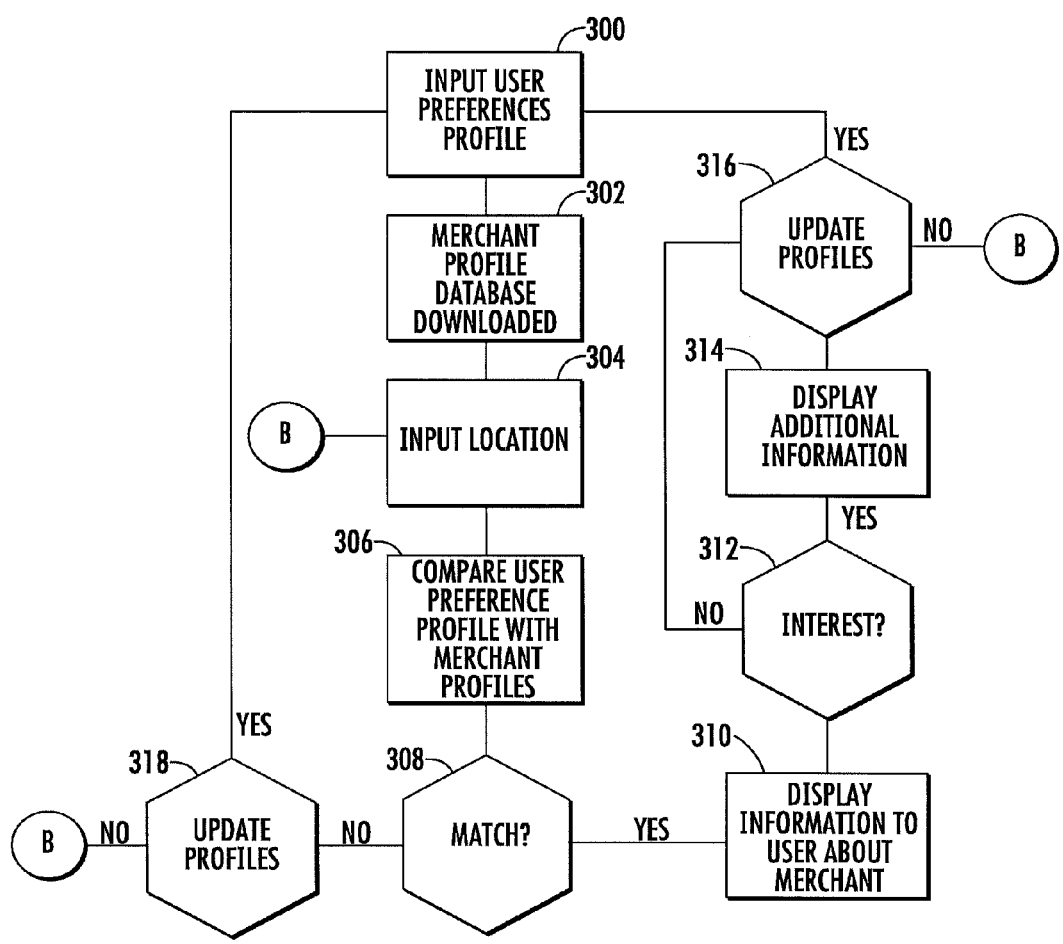
FIG. 9 is a flow chart diagram of the steps involved in matching the preferences of a user using a stand-alone remote device with a merchant's profile for one embodiment of the present invention.

Referring to FIG. 9, the preferred steps in matching users and merchants is shown in connection of a stand-alone remote device (i.e., no GPS and no wireless connection). In step 300, the user may input its preferences into the device. The merchant database is downloaded as described above, either filtered through preferences at the time of the download or filtered through preference files downloaded onto the device in step 302. During operation, the user indicates in step 304 where it is on the map displayed by a map reader in any of the known ways including, but not limited to: tapping a touch screen or typing in an address and/or coordinates. The preference data that has been downloaded and/or inputted onto the stand-alone remote device will then be compared in step 306. If the device determines that there are merchants that match the user's preferences in step 308, then the device will display those merchants to the user in step 310. If the user indicates it is interested in the merchant in step 312, the user may then elect to receive more information about the merchant in step 314. If the user does not desire more information, the system may then be restarted in either step 300 or 304 depending on whether the user elects to update the user information in step 316. Similarly, if the merchant does not match the user preferences in step 308, the system may be restarted in either step 300 or 304 depending on whether the user elects to update its preferences in step 318. It is appreciated that the step of downloading the merchant profile database may be repeated as desired to update information regarding the merchants. Additionally, it is also appreciated that the user may select specific pre-determined information to be downloaded into the device. For example, if the user is intending to travel to Baltimore and would like to have information on site-seeing tours in Washington, D.C., as well as restaurants in the Baltimore area, the user may input that information into the system. The system then may calculate the location of the user either through a GPS system or through software that calculates that longitude and latitude coordinates of the user and merchant that meets the preferences in the destination area through known geo-coding technology.

Figure 10:
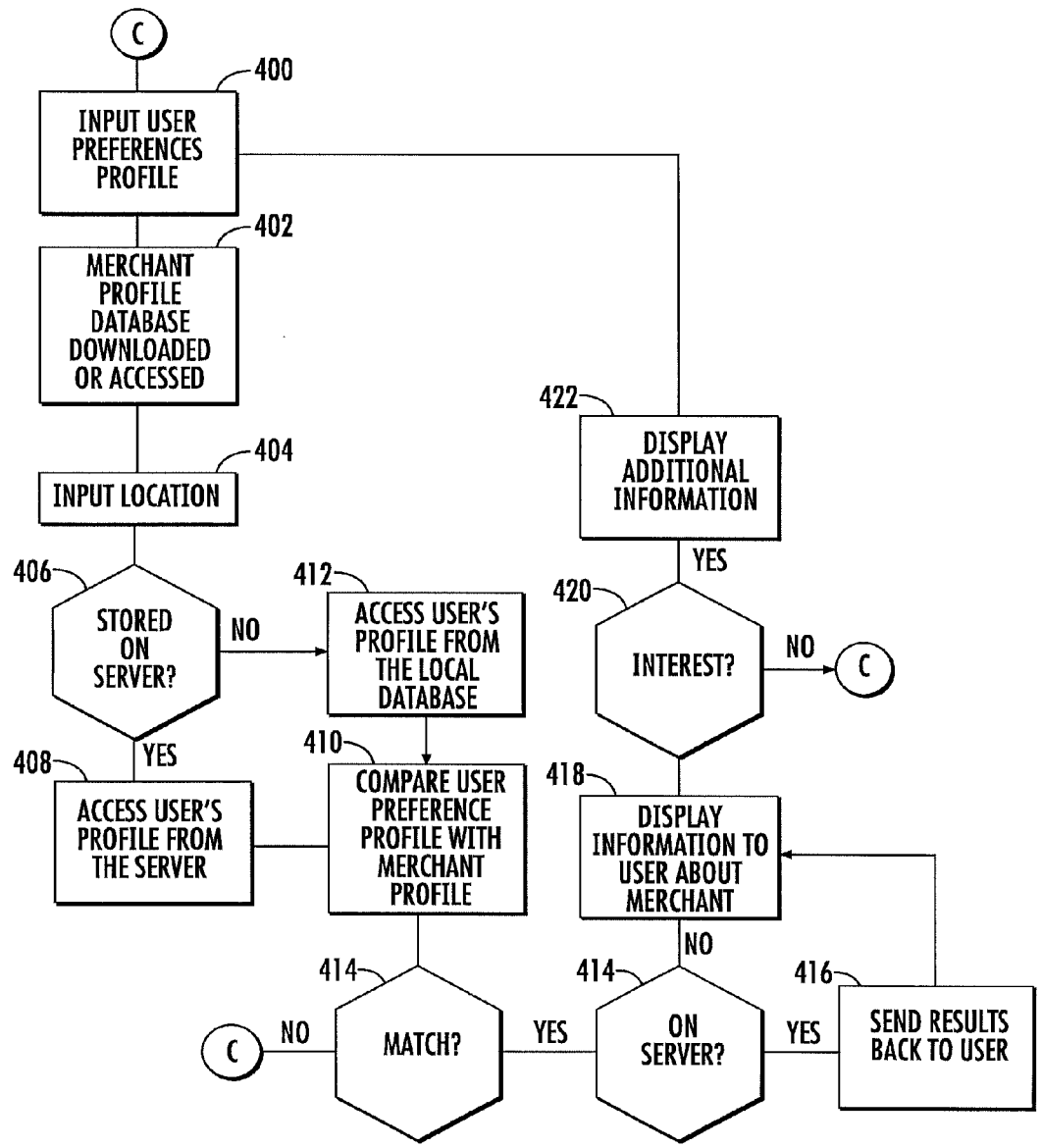
FIG. 10 is a flow chart diagram of the steps involved in matching the preferences of a user using a mobile device that does not have a constant link or "pulse" to a network with a merchant's profile for one embodiment of the present invention.

FIG. 10 shows the preferred steps in matching users using a mobile device that does not have a constant link or "pulse" to a network. Examples of such devices include, but are not limited to a Blackberry®, Palm® 705i, pager or cell phone (the "on-line" remote device). In order to start, the user inputs its preferences in step 400. The merchant profile database may then be accessed or downloaded in step 402. In order to assure that the system only matches those merchants that are within the prescribed distance limit from the user, the on-line device preferably constantly sends its current coordinates to the server in step 404. The databases containing all of the user preferences and merchant profiles may be either loaded onto the on-line device or may be run on the server in step 406. If the databases are run on the server, the server will thereby reduce its contact or messages with the on-line device to sending only hits or matches between the user preferences and the merchants. In operation, depending on whether the user's preference profile is stored on the server or on the on-line device, the user's preference profile will be accessed in either step 408 or step 412. Thereafter, the user's preferences will be compared with the information stored about the merchants to determine matches in step 410. It is appreciated that the matching process may be accomplished using the same algorithm as in the stand-alone device embodiment. Alternatively, the on-line remote device can carry the user's preferences (without having to download the location profiles and store them on its local database) and send the data back to the server to allow the matching to take place along with the GPS location check.

If it is determined that the place is of the type preferred by the user, and it is determined in step 414 that the matching process is operating on the remote server, then the results are sent back to the client in step 416. Thereafter, the results are displayed on the mobile device to the user in step 418. If, on the other hand, the matching process is not running on the server, but instead is running locally at the wireless device, then the results are displayed to the user at the wireless device in step 418.

If the user indicates any interest in the displayed place in step 420, then additional merchant resource information such as narratives from guidebooks and/or reviews may be transmitted and/or displayed to the user in step 422. If no interest is shown in step 420, then the process restarts in step 400, preferably after a one second threaded pause. It is appreciated that the user and/or merchant may also preferably update their preference profiles at any time, or if the user elects not to update its user profile, it may skip step 400 and proceed to step 404.

Figure 25:
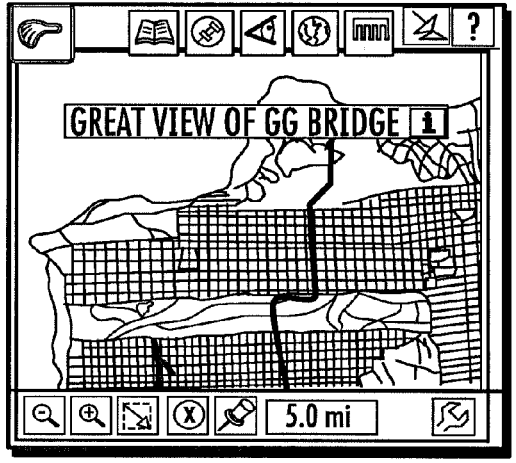
FIG. 25 is a screen shot illustrating a map of a particular geographic location in accordance with the present invention.
Figure 26:
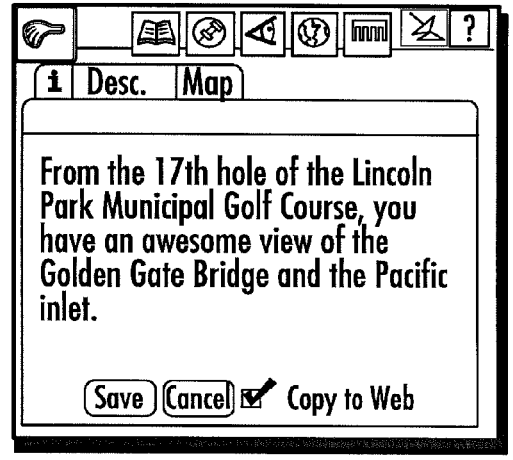
FIG. 26 is a screen shot of a narrative inputted by the user in accordance with the present invention.
Figure 27:
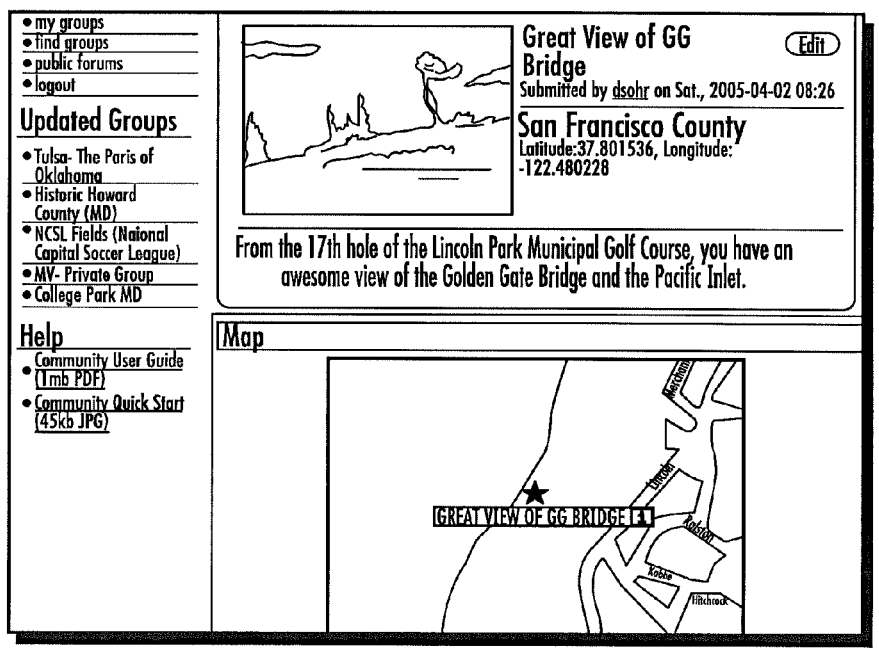
FIG. 27 is a screen shot of a user's entry of a particular location in accordance with the present invention.

Referring now to FIGS. 25 through 27, a plurality of screenshots illustrating one embodiment of point of information exchange to allow a user to share their own information and insights with others is shown. Through the point of interest exchange, which preferably is incorporated into the system in real time for access by others, users may input information on their favorite spots for use in, among other things, journals or to create map log ("plogs"). Accordingly, a user may capture their special experiences and memories as they travel for their own use or for sharing with others. In the latter case, the information may be made available for others so that it may be accessible as an additional information resource when the others come within their selected geographic distance to the particular site. In operation, the users enter a particular spot on the device using a stylus, keypad or other known means. The system then allows the user to enter a narrative of the location and/or upload photographs regarding the site. For example, referring again to the screen shots of FIGS. 25 to 27, an example of a user-created spot is shown in connection with the Golden Gate Bridge. The user first marks a spot on the map and labels it "Great View of GG Bridge". The user then entered a narrative describing the spot and uploaded a photograph showing the view to create a spot as shown in FIG. 27. The spot may thereafter be shared with others so that they may benefit from the insights and experience of prior users.

Figure 11:
FIG. 11 is a screenshot of information from a guide book available by categories in accordance with the present invention.
Figure 12:
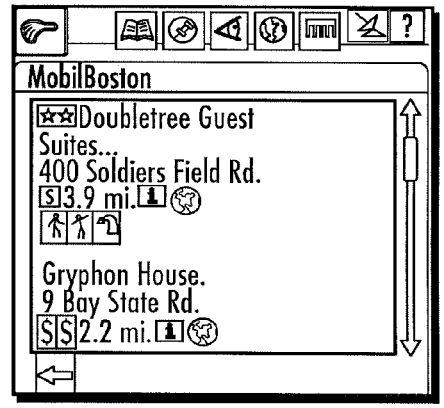
FIG. 12 is a screenshot of hotels within a certain distance from the user in accordance with the present invention.
Figure 13:
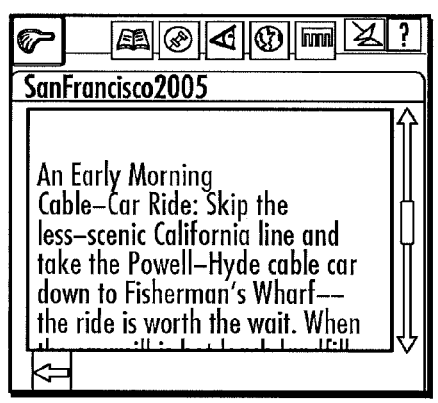
FIG. 13 is a screenshot of narrative content from a guidebook in accordance with the present invention.
Figure 14:
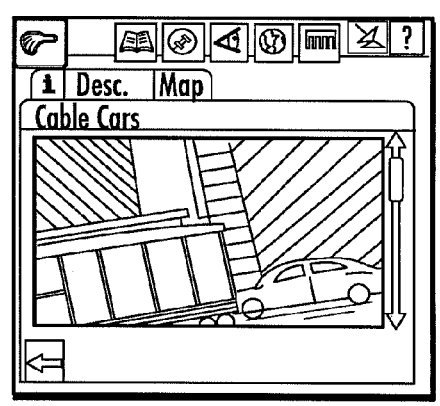
FIG. 14 is a screenshot illustrating a photograph from a guidebook in accordance with the present invention.

Referring now to FIGS. 11 through 16, another embodiment of the present invention is shown. In particular, it is appreciated that the system may also permit a user to browse or search the content information stored in and/or available through the system. For example, as shown in FIG. 11, the system may have available in electronic format, the content from a travel guide for Chicago. It is appreciated that the information may be browsed in any of the known ways including, but not limited to, drill down menus or categorical menus. Based upon the user's determined location, the system may then provide results based upon the selected fields within a certain geographic distance. For example, FIG. 12 shows hotels in Chicago that are within a few miles from the user's location. Each of the listings may also include a button, link or other means to access additional information about the particular place or thing as shown in FIGS. 13 and 14, which provide a narrative description and a photograph of a cable car ride in San Francisco. It is appreciated that, in addition to text and photographs, the contents may also include hypertext links to allow for additional information and resources to be accessed.

Figure 15:
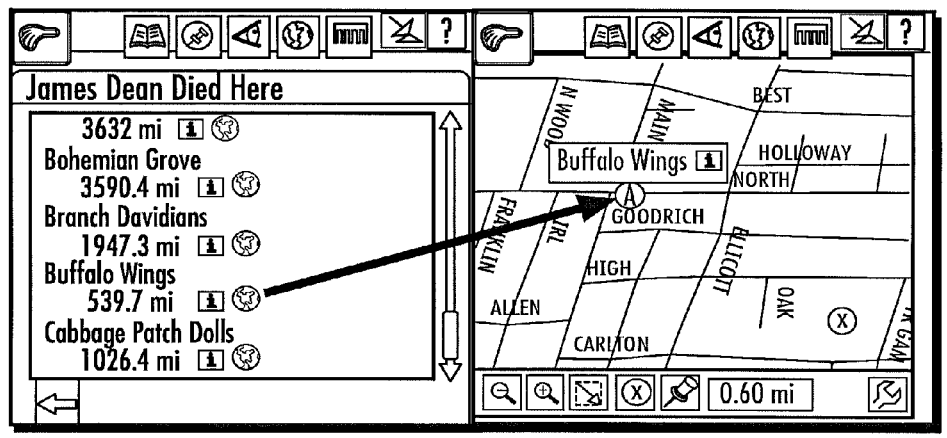
FIG. 15 is a pair of screenshots illustrating a map function for selected items in accordance with the present invention.
Figure 16:
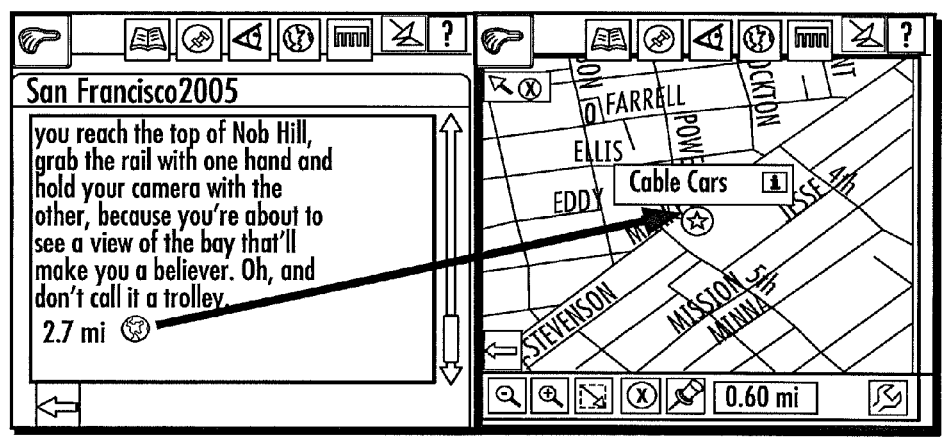
FIG. 16 is a pair of screenshots illustrating a map function in accordance with the present invention.

Referring now to FIGS. 15 and 16, screen shots illustrating the system's ability to link the content information to its mapping functions are shown. For example, upon obtaining a desired list of results, the user may click or otherwise select to view a map showing the location of one or more results. It is appreciated that the link to the mapping features of the system may be associated with, among other things, the list of results and/or the narrative output, as shown in FIGS. 15 and 16, respectively. Based on the determined location of the user, the system also preferably lists the distance from the user to the persons, places or things, wherein the system preferably dynamically updates the distance according to the user's movement.

Figure 28:
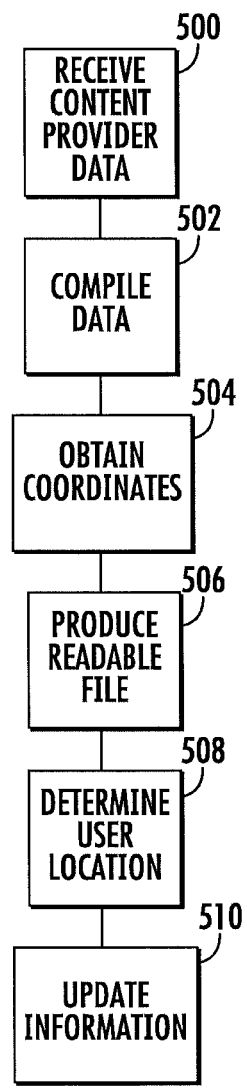
FIG. 28 is a flow chart diagram of the steps involved in producing digital works with embedded location information for one embodiment of the present invention.

Referring now to FIG. 28, a flow diagram of the steps involved in producing digital works with embedded location information for one embodiment of the present invention is shown. In operation, content providers such as publishers are given a compiler program that generates digital works (e.g, guides in digital format) in step 500. Alternatively, the content providers may supply data to the system operator or third party to compile. As the data is compiled in step 502, the compiler places editorial or literary information (e.g., narration, description, photos or drawings) into a mark-up language linking, among other things, text, pictures, coordinates, audio and/or video. Where physical addresses are indicated, the coordinates are obtained and associated with the related editorial or literary information in step 504. While the coordinates may be obtained in any of the known ways, in one embodiment, a call may be made to a geocoding server to obtain the coordinates. The compiler then produces a digital file in step 506 that can be read by the mobile device. Once the digital file is created and accessible by the mobile device, the user's location is determined in step 508 (e.g., by a GPS signal or indicating a location on a map by tapping or other means). Among other things, the output on the mobile device preferably includes the calculated distance between the user's location and the particular items displayed on the mobile device as the user accesses the material (e.g., a travel guide) on the mobile device. As the calculated distance is based on the user's location and the embedded location information on the items, the distance may be dynamically updated in step 510 as the user moves.

It is appreciated that the output of the digital works on the mobile device is preferably browsable to allow book-style page turning or combing.

Figure 29:
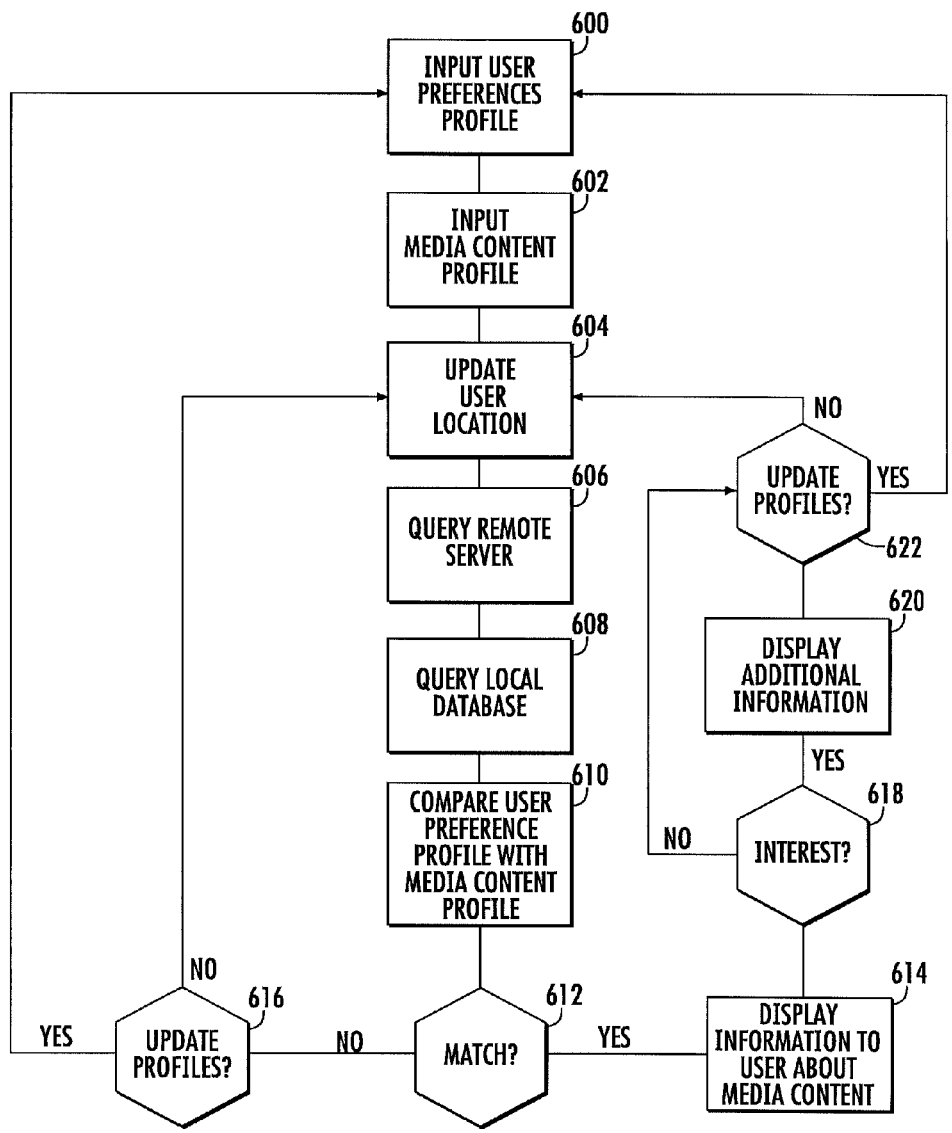
FIG. 29 is a flow chart diagram of the steps involved in matching the preferences of a user with media content profiles for one embodiment of the present invention.

Referring to FIG. 29, one embodiment of the steps in matching the preferences of a user with those of media content concerning people, places and things is shown. It is appreciated that the media content may include, but is not limited to: audio and/or video files; radio reports; narratives or other publications about persons, places or things from a publisher or other user; reviews; and photographs. After the user enters its preferences and profiles in step 600 and the profile of the media content is inputted in step 602, the GPS receiver 22 calculates the user's current position in step 604. The profile of the media content may include, among other things, attributes of the persons, places and things described in the media content, as well as the type of media content.

In operation, the remote server 23 is queried as to the profiles of the media content (e.g., the location of any people, places or things described in the media content) in step 606, while the local database 21 is queried with respect to the stated preferences of the user in steps 608. The software then compares the coordinates of the current location of the user, the preferences of the user and the profiles of the media content to determine if there is a match in step 610. While various methods may be used, the "Great Circle" equation is one example of a method for determining the distance between the place associated with the media content and the user, based on the distance between two points on a sphere. If any media content matches the preferences of the user in step 612, and the location of the people, places and/or things covered in the media content is within the distance range selected by the user, then the user is notified of the media content in step 614. Otherwise the user may elect to update its user preference profile in step 616, wherein the process would be repeating starting in step 600. Otherwise, the system will continue to monitor the user location in step 604 and continue the matching process.

Figure 30:
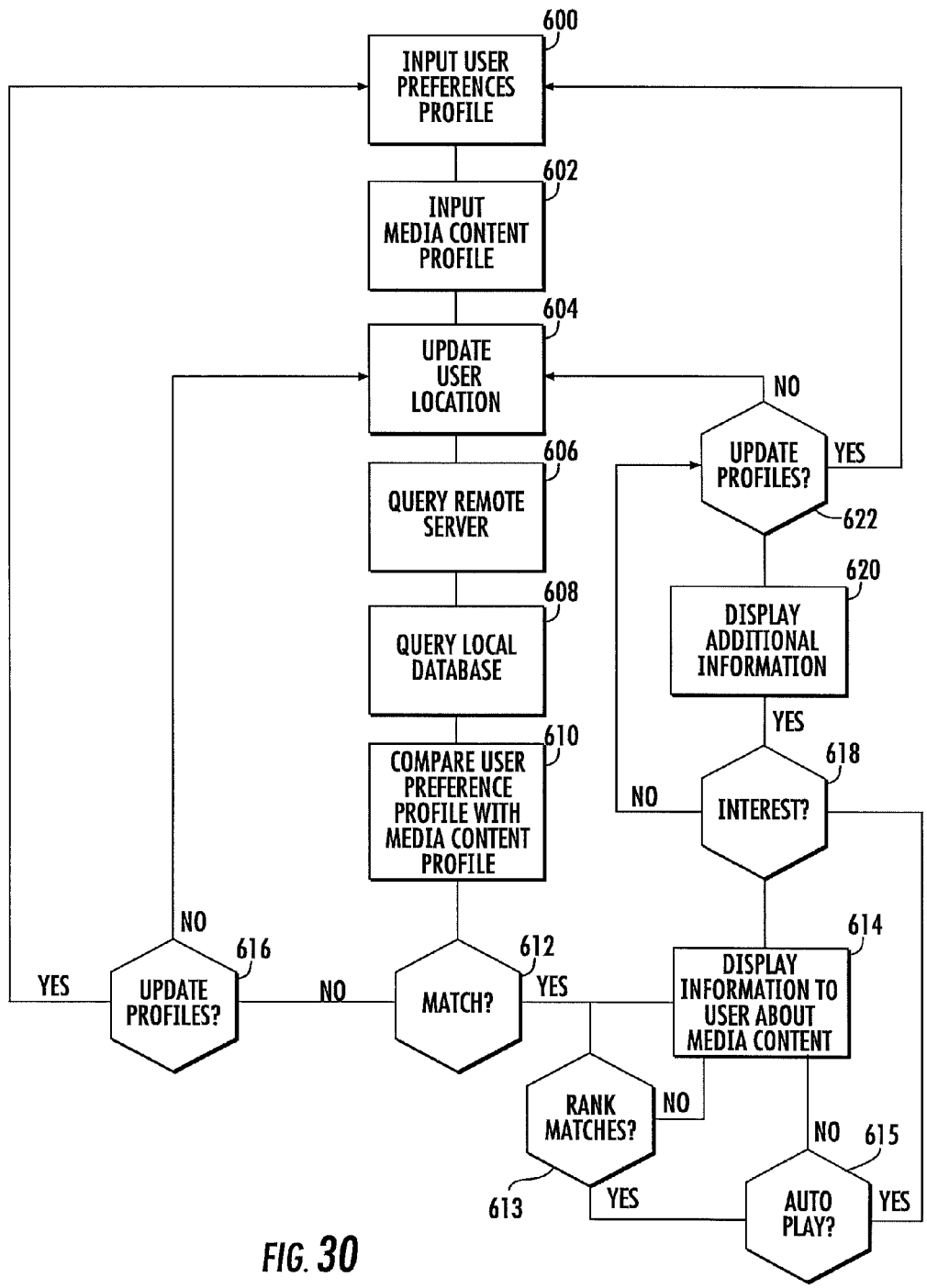
FIG. 30 is a flow chart diagram of another embodiment of the steps involved in matching the preferences of a user with media content profiles for one embodiment of the present invention.

Alternatively, as shown in FIG. 30, the system may rank the matches in step 613. Particularly, the system may identify a level of interest by the user, either from the user's direct inputted preferences or from information gleaned from the user's prior usage history. For example, a user may indicate a preference for certain sources or types of media over other that match a particular interest. The preferences may relate to, among other things: a categorical attribute such as a song, album, artist, publisher; a particular publisher, author or person otherwise identified with the media; or the format of the media such as a lecture, narrated text, radio discussion, or documentary. For example, if a user has a preference for Rock and Roll, the user may indicate that radio stations with a Rock and Roll format would have priority over a sermon or other lecture on Rock and Roll.

In operation, the system locates media content that is labeled or tagged with one or more interests (e.g., persons, places or things) that match the user's preferences. The system would then prioritize the media content that matches the user's preference based on the relative ranking. Higher rated matches may be indicated in any number of ways including, but not limited to: listing first or more predominantly than other listings; through a special notification; or by an immediate action. One form of immediate action would have the system facilitate the automatic playing of the highest rated matching media content in step 615. Referring back to FIG. 30, if the media content is not automatically played, notification of the matched media content will be provided to the user in step 614.

If several media content are determined to have equal ranking through the initial prioritization process, the system may further permit further prioritization through other factors such as, but not limited to, proximity to the user's location, type of media or the length of the media content. These factors may be inputted or selected by the user if desired.

Referring again to step 614, notification of the media content may include information pertaining to, among other things, the type of media content, the title of the media content, the author and/or producer of the media content, information on any persons, places or things described in the media content. If the user indicated he or she is interested in finding out more information about the person, place or thing described in the media content in step 618, the user may request more information, if desired, in step 620. The user may then elect to update its user preference profile in steps 622, wherein the process will be repeated starting in step 600. It is appreciated that the media content profile may also be updated at any time. Otherwise, the process restarts in step 604.

It will be understood that modifications and variations may be effected without departing from the scope of the novel concepts of the present invention, but it is understood that this application is limited only by the scope of the appended claims.

The invention claimed is:

1. A electronic computer implemented method for matching users with information, comprising:
   receiving a first user preference, a location of a mobile device of the first user, and a geographic area limitation;
   storing, for a plurality of objects, a set of attributes of each corresponding object, and a location of the corresponding object;
   determining an object of the plurality of objects that matches the first user based on at least:
      (a) the set of attributes for the object satisfies the first user preference, and
      (b) the distance between the received location of the mobile device of the first user and the object is within the geographic area limitation;
   sending to the first user, in response to a positive outcome of the determining, information about the matching object; and
   wherein the matching object is a person, place and/or thing.

2. The method of claim 1, wherein receiving a first user preference further comprises receiving, at the same time or at different times, the first user preference, the location of a mobile device of the first user, and the geographic area limitation.

3. The method of claim 1, wherein receiving a first user preference comprises receiving substantially real time updates of the location of the mobile device of the first user.

4. The method of claim 1, further comprising serially repeating the determining and receiving the location of the mobile device, wherein new matches are identified as the first user moves relative to the plurality of objects.

5. The method of claim 1, wherein the geographic area limitation is a distance from the mobile device of the first user, or a geometric shape centered on the mobile device of the first user.

6. The method of claim 1, wherein the information about the matching object includes a distance to the matching object.

7. The method of claim 5, wherein determining further comprises identifying a plurality of matching objects, and the sending sends information about the plurality of matching objects.

8. An apparatus comprising:
   a database configured to store, for a plurality of objects, a set of attributes of each corresponding object, and a location of the corresponding object;
   a server coupled to the database, wherein the server is configured to:
      receive a first user preference, a location of a mobile device of the first user, and a geographic area limitation;
      determine an object of the plurality of objects in the database that matches the first user based on at least:
         (a) the set of attributes for the object satisfies the first user preference, and
         (b) the distance between the received location of the mobile device of the first user and the object is within the geographic area limitation;
      send to the first user, in response to a positive outcome of the determining, information about the matching object; and
   wherein the matching object is a person, place and/or thing.

9. The apparatus of claim 8, wherein the server being configured to receive a first user preference further comprises the server being configured to receive, at the same time or at different times, the first user preference, the location of a mobile device of the first user, and the geographic area limitation.

10. The apparatus of claim 8, wherein the server being configured to receive a first user preference comprises the server being configured to receive substantially real time updates of the location of the mobile device of the first user.

11. The apparatus of claim 8, further comprising the server being configured to serially repeat determining and receiving the location of the mobile device, wherein the server identifies new matches as the first user moves relative to the plurality of objects.

12. The apparatus of claim 8, wherein the geographic area limitation is a distance from the mobile device of the first user, or a geometric shape centered on the mobile device of the first user.

13. The apparatus of claim 8, wherein the information about the matching object includes a distance to the matching object.

14. The apparatus of claim 13, wherein the server being configured to determine further comprises the server being configured to identify a plurality of matching objects, and the information includes information about the plurality of matching objects.

15. A computer readable medium containing computer code configured for execution on electronic computer hardware for matching users with information, comprising:
   code for first receiving, from a first user, a set of first user preferences, a location of a mobile device of the first user, and a geographic area limitation;
   code for second receiving, from a second user, a set of second characteristics of the second user, and a location of the second user;
   code for determining whether a match exists between the first user and a second user based on at least:
      (a) a match between the set of first user preferences and the set of second user characteristics; and (b) the distance between the received locations of the first and second users is within the geographic area limitation;

code for sending to the first user, in response to a positive outcome of the code for determining, information about the second user.

16. The computer code of claim 15, wherein the code for first receiving is configured to receive, at the same time or at different times, the set of first user preferences, the location of a mobile device of the first user, and the geographic area limitation.

17. The computer code of claim 15, wherein the code for first receiving comprises code for receiving substantially real time updates of the location of the mobile device of the first user.

18. The computer code of claim 15, further comprising code for serially repeating the execution of the code for determining and code for first receiving the location of the mobile device, wherein the code for determining identifies new matches as the first user moves.

19. The method of claim 15, wherein the geographic area limitation is a distance from the mobile device of the first user, or a geometric shape centered on the mobile device of the first user.

20. The computer code of claim 15, wherein the information includes a distance to the second user.

* * * * *